US011371482B2

(12) United States Patent
Hancock et al.

(10) Patent No.: US 11,371,482 B2
(45) Date of Patent: *Jun. 28, 2022

(54) WIND TURBINE BLADES

(71) Applicant: Vestas Wind Systems A/S, Aarhus N. (DK)

(72) Inventors: Mark Hancock, Southampton (GB); Frank Hoelgaard Hahn, Ringkøbing (DK); Chris Payne, Bristol (GB)

(73) Assignee: Vestas Wind Systems A/S, Aarhus N (DK)

( * ) Notice: Subject to any disclaimer, the term of this patent is extended or adjusted under 35 U.S.C. 154(b) by 27 days.

This patent is subject to a terminal disclaimer.

(21) Appl. No.: 16/658,250

(22) Filed: Oct. 21, 2019

(65) Prior Publication Data

US 2020/0049128 A1 Feb. 13, 2020

Related U.S. Application Data

(63) Continuation of application No. 14/365,467, filed as application No. PCT/DK2012/050458 on Dec. 11, 2012, now Pat. No. 10,487,797.

(Continued)

(30) Foreign Application Priority Data

Dec. 16, 2011 (GB) ..................... 1121649

(51) Int. Cl.
*F03D 1/06* (2006.01)
*B29C 70/84* (2006.01)
(Continued)

(52) U.S. Cl.
CPC .......... *F03D 1/0675* (2013.01); *B29C 70/443* (2013.01); *B29C 70/84* (2013.01);
(Continued)

(58) Field of Classification Search
None
See application file for complete search history.

(56) References Cited

U.S. PATENT DOCUMENTS 7,841,835 B2 11/2010 Bagepalli et al.
8,043,065 B2 * 10/2011 Kyriakides ........... F03D 1/0675
416/224
(Continued)

FOREIGN PATENT DOCUMENTS

CN 201165932 Y 12/2008
CN 102230448 A 11/2011
(Continued)

OTHER PUBLICATIONS

International Searching Authority, International Search Report and Written Opinion issued in corresponding PCT Application No. PCT/DK2012/050458 dated Mar. 3, 2013, 13 pages.

(Continued)

*Primary Examiner* — Juan G Flores
(74) *Attorney, Agent, or Firm* — Wood Herron & Evans LLP

(57) ABSTRACT

A reinforcing structure for a wind turbine blade is in the form of an elongate stack of layers of pultruded fibrous composite strips supported within a U-shaped channel. The length of each layer is slightly different to create a taper at the ends of the stack; the centre of the stack has five layers, and each end has a single layer. The ends of each layer are chamfered, and the stack is coated with a thin flexible pultruded fibrous composite strip extending the full length of the stack. The reinforcing structure extends along a curved path within the outer shell of the blade. The regions of the outer shell of the blade on either side of the reinforcing (Continued)

structure are filled with structural foam, and the reinforcing structure and the foam are both sandwiched between an inner skin and an outer skin.

36 Claims, 13 Drawing Sheets

Related U.S. Application Data

(60) Provisional application No. 61/588,247, filed on Jan. 19, 2012.

(51) Int. Cl.
| | |
|---|---|
| *B29C 70/44* | (2006.01) |
| *B29C 70/86* | (2006.01) |
| *B29D 99/00* | (2010.01) |
| *B29L 31/08* | (2006.01) |

(52) U.S. Cl.
CPC ........ *B29C 70/865* (2013.01); *B29D 99/0025* (2013.01); *B29D 99/0028* (2013.01); *B29L 2031/085* (2013.01); *F05B 2230/50* (2013.01); *F05B 2230/60* (2013.01); *F05B 2240/301* (2013.01); *F05B 2280/6003* (2013.01); *F05B 2280/702* (2013.01); *Y02E 10/72* (2013.01); *Y02P 70/50* (2015.11); *Y10T 156/10* (2015.01)

(56) References Cited

U.S. PATENT DOCUMENTS

| | | | | |
|---|---|---|---|---|
| 8,043,067 | B2 * | 10/2011 | Kuroiwa | F03D 1/0675 416/230 |
| 8,529,717 | B2 * | 9/2013 | Hedges | B29C 70/083 156/83 |
| 8,540,491 | B2 * | 9/2013 | Gruhn | B23P 15/04 416/230 |
| 8,905,718 | B2 * | 12/2014 | Hayden | F03D 1/065 416/224 |
| 10,487,797 | B2 * | 11/2019 | Hancock | B29C 70/865 |
| 2006/0133937 | A1 | 6/2006 | DeLeonardo et al. | |
| 2007/0140861 | A1 | 6/2007 | Wobben | |
| 2008/0145615 | A1 | 6/2008 | Jacobsen et al. | |
| 2008/0277053 | A1 * | 11/2008 | Stiesdal | B29C 70/547 156/245 |
| 2009/0169392 | A1 * | 7/2009 | Kuroiwa | F03D 1/0675 416/241 A |
| 2009/0220747 | A1 | 9/2009 | Karem | |
| 2010/0143142 | A1 | 6/2010 | Akhtar | |
| 2011/0084496 | A1 | 4/2011 | Kuroiwa | |
| 2011/0135485 | A1 | 6/2011 | Wang | |
| 2011/0171038 | A1 | 7/2011 | Esaki et al. | |
| 2012/0027609 | A1 | 2/2012 | Ogde et al. | |
| 2012/0093656 | A1 | 4/2012 | Esaki et al. | |

FOREIGN PATENT DOCUMENTS

| | | |
|---|---|---|
| DE | 102009024324 A1 | 12/2010 |
| DE | 102012104238 A1 | 11/2012 |
| EP | 1520983 A1 | 4/2005 |
| EP | 1754589 A1 | 2/2007 |
| EP | 1990178 B1 | 7/2010 |
| EP | 2341239 A2 | 7/2011 |
| EP | 2444660 A1 | 4/2012 |
| EP | 2497945 A1 | 9/2012 |
| EP | 2567807 A1 | 3/2013 |
| EP | 2791500 B1 | 3/2019 |
| EP | 3505751 A1 | 7/2019 |
| GB | 2497578 A | 6/2013 |
| JP | 2001165033 A | 6/2001 |
| JP | 2009287514 A | 12/2009 |
| WO | 03008800 A1 | 1/2003 |
| WO | 2006082476 A2 | 8/2006 |
| WO | 2006082479 A1 | 8/2006 |
| WO | 2009059604 A1 | 5/2009 |
| WO | WO-2009059604 A1 * | 5/2009 |
| WO | 2009155920 A1 | 12/2009 |
| WO | 2010065928 A1 | 6/2010 |
| WO | 2011004504 A1 | 1/2011 |
| WO | 2011004540 A1 | 1/2011 |
| WO | 2011078327 A1 | 6/2011 |
| WO | 2011088372 A1 | 7/2011 |
| WO | 2009147740 A1 | 10/2011 |
| WO | 2011135306 A1 | 11/2011 |
| WO | WO-2011135306 A1 * | 11/2011 |
| WO | 2013087078 A1 | 6/2013 |

OTHER PUBLICATIONS

Intellectual Property Office, Combined search and examination report issued in corresponding GB application No. GB1121649.6 dated Apr. 10, 2012, 4 pages.
European Patent Office, Examination Report in EP Application No. 12805931.8, dated Feb. 1, 2017.
Korean Intellectual Property Office, Notice of Non-Final Rejection in KR Application No. 10-2014-7019720, dated Oct. 30, 3015.
Japanese Patent Office, Notification of Reasons for Refusal in JP Application No. 2014-546321, dated Jun. 30, 2016.
Japanese Patent Office, Notification of Reasons for Refusal in JP Application No. 2014-546321, dated Jun. 30, 2015.
The State Intellectual Property Office of China, First Notification of Office Action in CN Application No. 201280069867.1, dated May 4, 2016.
European Patent Office, European Search Report in EP Application No. 19156353.5, dated Jun. 5, 2019.
Brazilian Patent Office, Office Action in BR112014014708-6, undated.
European Patent Office, Extended European Search Report in EP Application No. 21159223.3, dated Jul. 6, 2021.
European Patent Office, Response to Notices of Opposition in EP Patent No. 2791500, Jul. 22, 2020.
European Patent Office, Summons to attend oral proceedsings in EP Patent No. 2791500, Jul. 22, 2020.
European Patent Office, Communication of a notice of opposition in EP Application No. 19156353.5, Jan. 5, 2022.
David Hartman, 2006 Wind Turbine Blade Workshop Materials and Manufacturing Research, Advances in Material Technology, Apr. 19, 2006 (D9a).
C. Van Hoornweder et al., Reinforcing Wind Energy, WPA 2009 (D10a).
Mala Nagarajan, Advances in Wind Turbine Blade Composites, Jul. 21, 2010 (D10b).
Sandia National Laboratories, 2010 Wind Turbine Blade Workshop, Jul. 20-22, 2019 (D10c).
Paul Veers, Wind Energy Fundamentals and Wind Turbine Blades, Design & Manufacturing 2009, Sep. 23, 2009 (D15).
Stephen C. Nolet, Composite Wind Turbine Engineering and Manufacturing, Jan. 20, 2011 (D16).
WIPO, Certified Copy of Priority Document, U.S. Appl. No. 61/588,247, filed Jan. 19, 2012 (D7a).
2006 Wind Turbine Blade Workshop, Apr. 17-18, 2006 (D9b).
Trevor F. Starr, Pultrusion for engineers, Woodhead Publishing Ltd and CRC Press LLC, 2000 (D26).
Douglas S. Cairns et al., Evaluation of Hand Lay-Up and Resin Transfer Molding in Composite Wind Turbine Blade Structures, American Institute of Aeronautics & Astronautics, 2001 (D205).
Thomas J. Reinhart, Engineered Materials Handbook vol. 1, Composites, ASM International Handbook Chairman, 1987 (D24).
Eva Bittmann, Viel Wind um GFK, KU Kunststoffe, 2002 (D23).
Hau Erich, Windkraftanlagen, Springer-Verlag Berlin Heidelberg, 2008 Ed.4 Auflage (D21).

* cited by examiner

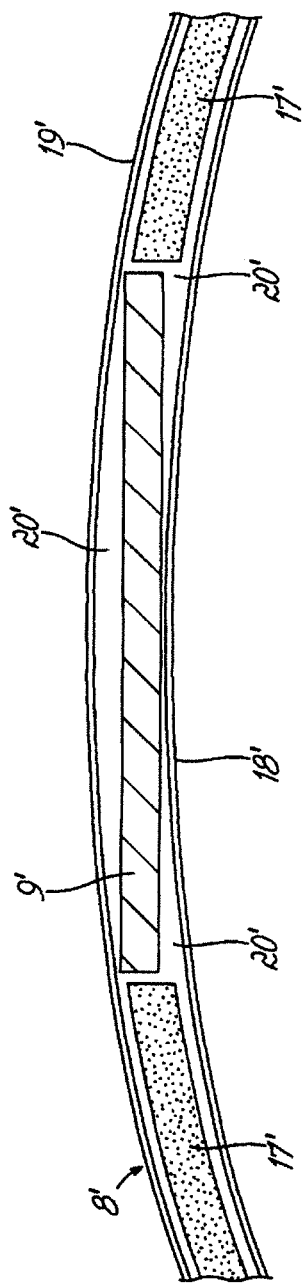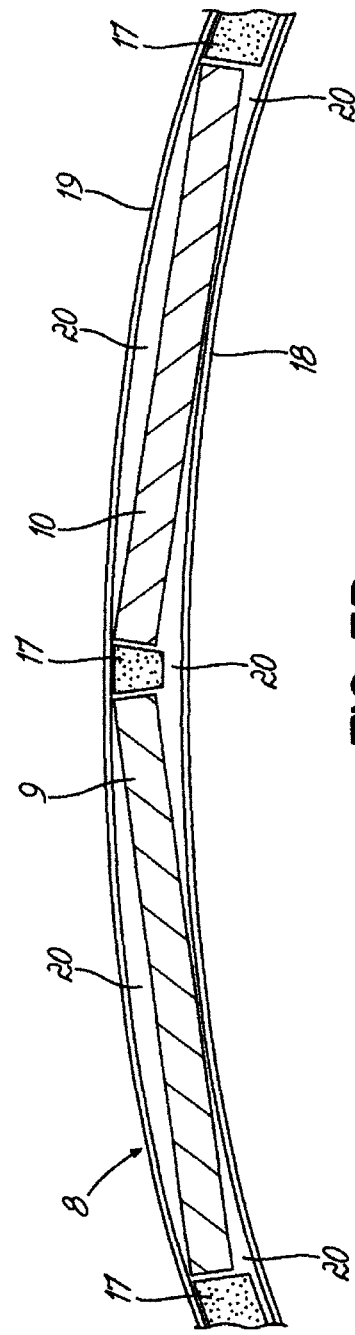
FIG. 3A
FIG. 3B

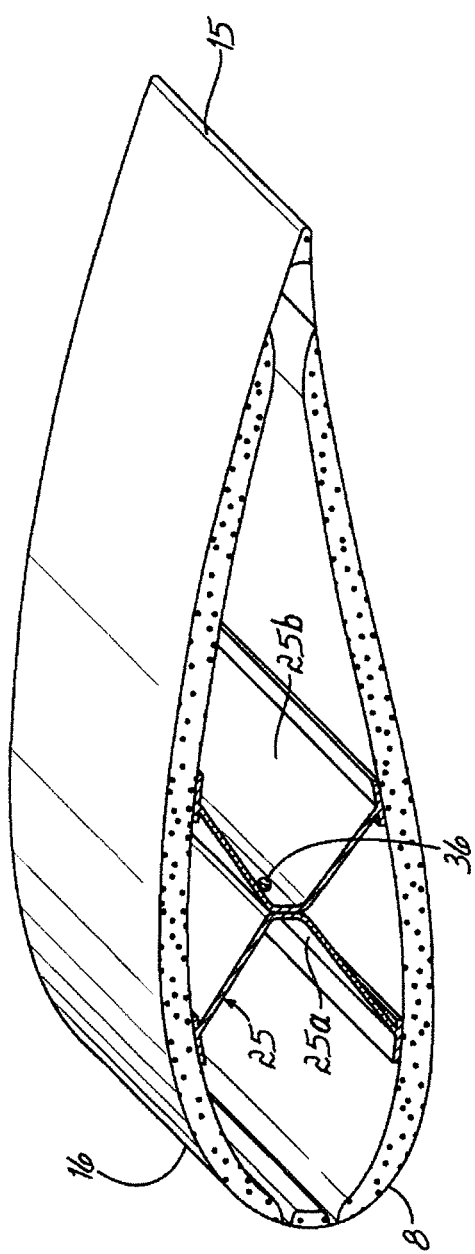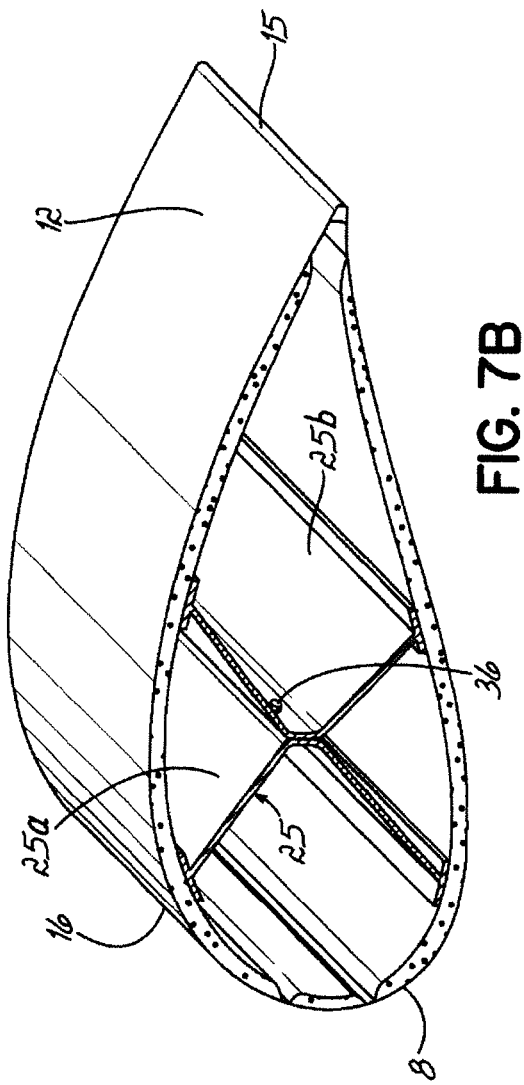

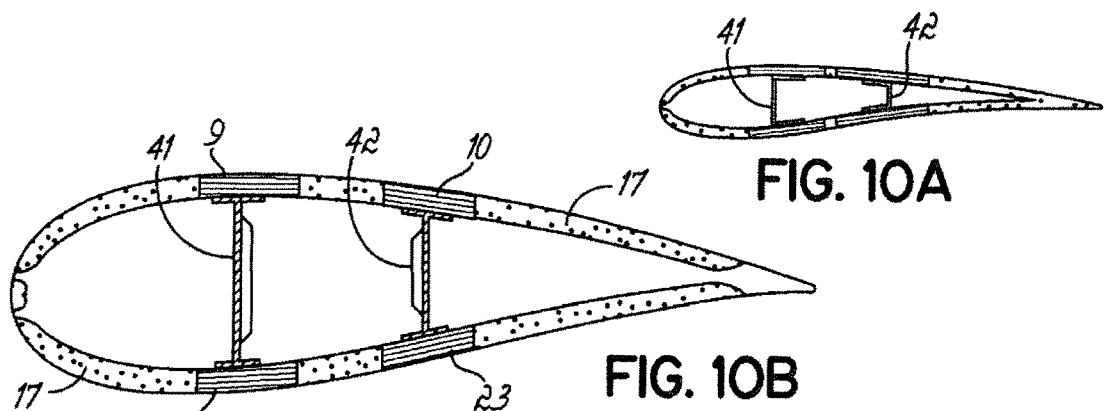
FIG. 10A
FIG. 10B
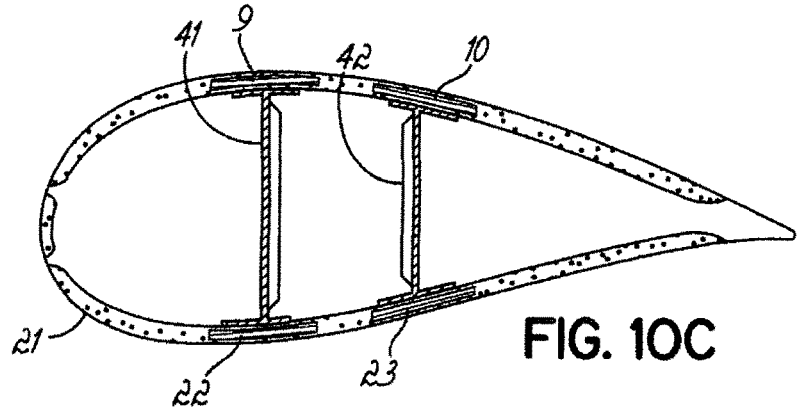
FIG. 10C
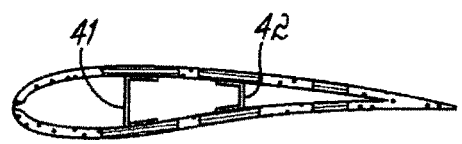
FIG. 10D
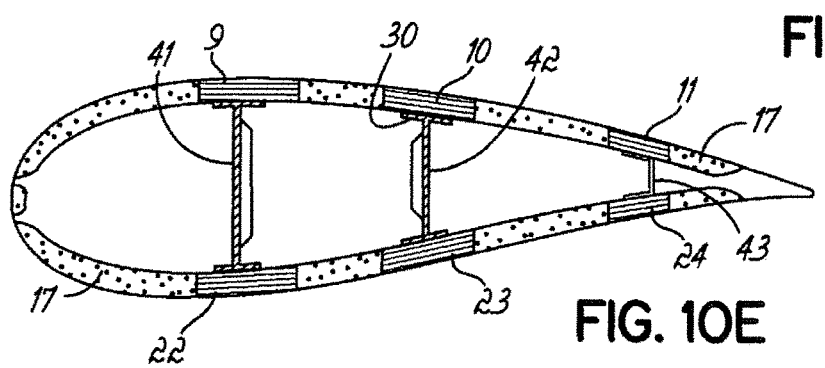
FIG. 10E
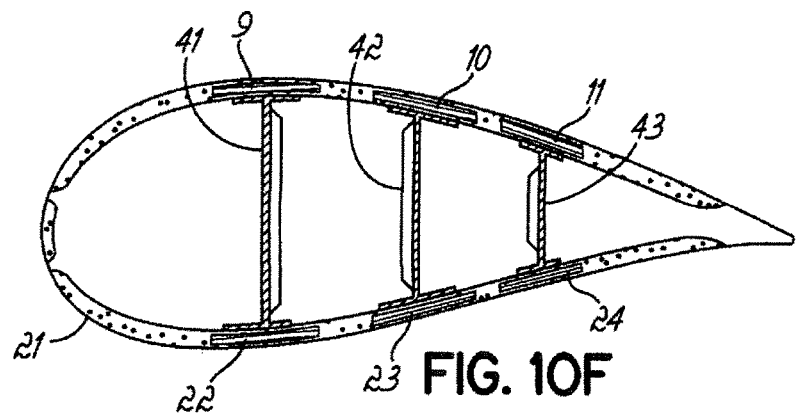
FIG. 10F

WIND TURBINE BLADES

CROSS REFERENCE TO RELATED APPLICATIONS

This application is a continuation of U.S. patent application Ser. No. 14/365,467, filed Jun. 13, 2014 (pending), which is a U.S. National Phase Application of International Application No. PCT/DK2012/050458, filed Dec. 11, 2012 (expired), which claimed the benefit of U.S. Provisional Application Ser. No. 61/588,247, filed Jan. 19, 2012 and United Kingdom Patent Application No. 1121649.6, filed Dec. 16, 2011, the disclosures of which are incorporated by reference herein in their entirety.

TECHNICAL FIELD

The present invention relates to rotor blades for wind turbines and to methods of manufacturing wind turbine blades.

BACKGROUND

A typical wind turbine is illustrated in FIG. 1. The wind turbine 1 comprises a tower 2, a nacelle 3 mounted at top of the tower 2 and a rotor 4 operatively coupled to a generator 5 within the nacelle 3. The wind turbine 1 converts kinetic energy of the wind into electrical energy. In addition to the generator 5, the nacelle 3 houses the various components required to convert the wind energy into electrical energy and also the various components required to operate and optimize the performance of the wind turbine 1. The tower 2 supports the load presented by the nacelle 3, the rotor 4 and other wind turbine components within the nacelle 3.

The rotor 4 includes a central hub 6 and three elongate rotor blades 7a, 7b, 7c of approximately planar configuration which extend radially outward from the central hub 6. In operation, the blades 7a, 7b, 7c are configured to interact with the passing air flow to produce lift that causes the central hub 6 to rotate about its longitudinal axis. Wind speed in excess of a minimum level will activate the rotor 4 and allow it to rotate within a plane substantially perpendicular to the direction of the wind. The rotation is converted to electric power by the generator 5 and is usually supplied to the utility grid.

A conventional rotor blade is made from an outer shell and an inner hollow elongate spar of generally rectangular cross section. The spar serves to transfer loads from the rotating blade to the hub of the wind turbine. Such loads include tensile and compressive loads directed along the length of the blade arising from the circular motion of the blade and loads arising from the wind which are directed along the thickness of the blade, i.e., from the windward side of the blade to the leeward side.

An alternative type of rotor blade is known which avoids the need for an inner spar by incorporating within the outer shell one or more fibrous reinforcing structures of high tensile strength which extend along the lengthwise direction of the blade. Examples of such arrangements are described in EP 1 520 983 and WO 2006/082479. Other arrangements are also described in US 2012/0014804 and WO 2011/088372.

In these arrangements, use is made of pultruded fibrous strips of material. Pultrusion is a continuous process similar to extrusion, wherein fibres are pulled through a supply of liquid resin and then heated in an open chamber where the resin is cured. The resulting cured fibrous material is of constant cross section but, since the process is continuous, the material once formed may be cut to any arbitrary length. Such a process is particularly cheap and therefore an attractive option for the manufacture of reinforcing structures for wind turbine blades.

The use of cured pultruded strips overcomes problems associated with conventional arrangements in which non-cured fibres are introduced into a mould to form parts of a wind turbine blade, in which there is a risk of the fibres becoming misaligned.

Furthermore, pultruded strips have the property of absorbing the very high bending moments which arise during rotation of wind turbine blades.

In the above two known arrangements, a relatively large number of separate elements are used to form the reinforcing structure, and each element must be individually positioned within the structure of the shell.

It would be desirable to provide a suitable reinforcing structure for a wind turbine blade of this alternative type which is of simpler construction and therefore cheaper to manufacture.

US 2009/0269392 describes a wind turbine blade comprising elongate structural members formed from laminated fibre cloths infiltrated with resin.

However, in this arrangement the fibre cloths are cured in situ which requires the cloths to be carefully positioned and correctly oriented on the surface of the shell prior to moulding.

It would therefore be desirable to provide a wind turbine blade which overcomes, or at least mitigates, some or all of the above disadvantages of known wind turbine blades.

SUMMARY

Thus, in accordance with a first aspect of the present invention there is provided a wind turbine blade of generally hollow construction and formed from first and second opposing half-shells; each half-shell comprising an inner skin and an outer skin and first and second elongate reinforcing structures being located between the inner and outer skins; each reinforcing structure extending along the lengthwise direction of the blade and comprising a stack of layers; each stack having a thickness which extends in a direction substantially perpendicular to a surface of the blade; each layer extending across a width of the respective stack, the width being perpendicular to the lengthwise direction of the blade and perpendicular to the thickness of the stack, and each layer comprising at least one pre-cured pultruded fibrous composite strip; each half-shell further comprising core material disposed between the inner and outer skins and extending: (a) between the first and second elongate reinforcing structures; (b) from the first elongate reinforcing structure towards a leading edge of the blade; and (c) from the second elongate reinforcing structure towards a trailing edge of the blade; the wind turbine blade further comprising an elongate web extending between at least one of the reinforcing structures in the first half-shell and at least one of the reinforcing structures in the second half-shell.

The stack functions within the wind turbine blade as a spar cap. Preferably, the width of each stack extends within the blade, in use, in a generally chordwise direction within a plane substantially parallel to the surface of the blade. Preferably, in a cross-section oriented transversely to the lengthwise direction of the blade, each stack has the shape of an oblong rectangle, wherein the thickness of the stack is parallel to the shorter sides of the rectangle and the width of the rectangle is parallel to the longer sides of the rectangle.

The web is elongate in the lengthwise direction of the blade. It extends in a transverse direction between at least one of the reinforcing structures in the first half-shell and at least one of the reinforcing structures in the second half-shell. As exemplified below, the blade can have two I-shaped or C-shaped webs, each extending between one of the reinforcing structures in the first half-shell and one of the reinforcing structures in the second half-shell. In other embodiments, some of which are described below, the blade has a web with an X-shaped cross-section, extending between two reinforcing structures in the first half-shell and two reinforcing structures in the second half-shell.

A major technical advantage of providing at least two such reinforcing structures within each half-shell arises from the curvature of the wind turbine blade. In order to achieve the desired curvature, the inner surfaces of the moulds used to manufacture the half-shells are also curved, and this imparts a corresponding curvature to the inner and outer skins during the moulding process. Since the upper and lower surfaces of the stacks are substantially planar, this gives rise to a gap between the surfaces of the stacks and the curved inner and outer skins, which will be filled with resin during moulding. In order to optimise the strength of the resulting turbine blade, it is desirable to reduce the size of the gap. With the present invention, this is achieved by providing at least two reinforcing structures within each half-shell, such that each structure can have a smaller width than would be required when only a single reinforcing structure is provided.

The elongate reinforcing structures and the core material define abutment edges which are preferably substantially perpendicular to the surface of the wind turbine blade. Such an arrangement is advantageous in that it permits the reinforcing structures to be manufactured a low cost. Furthermore, during the moulding operation, it is possible to place the core material in the mould before the reinforcing structures, and to use the edges of the core material to assist in the location of the reinforcing structures in the mould. This would not necessarily always be possible if the abutment edges of the reinforcing structures were not perpendicular. The perpendicular direction is also the thickness direction of the wind turbine blade.

The wind turbine blade preferably further comprises, within each half-shell, a pre-cured mesh located between the outer skin and at least one of the elongate reinforcing structures. In addition or alternatively, the wind turbine blade preferably further comprises, within each half-shell, a pre-cured mesh located between the inner skin and at least one of the elongate reinforcing structures. In each case, the mesh may be made from glass weave and pre-cured resin. The blade preferably comprises, within at least one of the half-shells, a pre-cured mesh located between the outer skin and a region of abutment of one of the elongate reinforcing structures and the core material. The blade preferably comprises, within at least one of the half-shells, a pre-cured mesh located between the inner skin and a region of abutment of one of the elongate reinforcing structures and the core material.

Such meshes provide additional stiffness at the transition regions between the reinforcing structures and the core material. In addition, the meshes effectively prevent wrinkling of the inner and outer skins of the turbine blades which could otherwise occur when there are gaps between the underlying reinforcing structures and the core material or when the thickness of the reinforcing structures is different from the thickness of the core material.

The stack preferably has a substantially rectangular cross section throughout its length and/or preferably a substantially constant width. Furthermore, the pultruded fibrous composite strips are preferably of substantially uniform cross section.

By forming the reinforcing structure from a stack of layers, it is possible to form the entire reinforcing structure as a separate component and then to incorporate the entire reinforcing structure in a single operation.

Furthermore, since pultruded fibrous composite strips are cheap to manufacture, and can readily be cut to any desired length, the resulting reinforcing structure can therefore be conveniently constructed at low cost.

An additional advantage of this arrangement is that it becomes possible to adjust the thickness of the stack at any point along its length, so as to conform to the desired thickness profile of the outer shell of the wind turbine blade, simply by selecting the number of layers to be incorporated in the stack at that point. It is therefore possible to form the reinforcing structure with any desired thickness profile, which matches the tapering shape of the turbine blade.

It is normally desirable in wind turbine blades to provide a greater degree of reinforcement along the central section of the blade along the longitudinal axis of the blade, i.e., the region mid-way between the root and the tip of the blade, since this is where most of the tensile stresses are encountered by the blade. Thus, a particularly desirable thickness profile is one where the central section of the reinforcing structure is of maximum thickness, and where one or both of the end sections are of minimum thickness.

It is therefore preferred that the layers within the reinforcing structure are of different lengths such that the thickness of the stack is tapered towards at least one end.

In the simplest arrangement, in which each layer of the stack has ends which are square-cut, this will result in a stack having a stepwise taper, the height of each step being the thickness of each layer. To reduce the concentration of stresses at the ends of the layers, it would be desirable for the thickness profile at the end of the stack to be smoother. It is therefore preferred that at least one of the two ends of each layer be chamfered. In this way, the upper surface of the stack can be made smoother along its full length.

Even still, unless the chamfer is of a sufficiently small angle, there will still be discontinuities in the gradient along the tapered ends.

To increase the smoothness even further, it is preferred that the stack further comprise a covering layer extending the full length of the stack. Such a covering layer may have a thickness which is substantially less than the thickness of the other layers within the stack, for example the covering layer may be one quarter of the thickness of the other layers. This enables the covering layer to be sufficiently flexible so as to "bed down" on the upper surface of the stack and thereby smoothen out the changes in the orientation of the underlying surface.

For example, in the preferred embodiment, there are five layers within each stack, and the thickness of each layer is approximately 4 mm, i.e., between 3.5 mm and 4.5 mm, whereas the thickness of the covering layer is only approximately 1 mm, i.e., between 0.5 mm and 1.5 mm. The advantage of a thickness of 4 mm for each layer is that the pultruded strips can be supplied in a roll.

The width of each layer is preferably about 150 mm, i.e., between 140 mm and 160 mm, since this provides the necessary degree of edgewise stiffness to prevent substantial edgewise vibration.

Other embodiments are envisaged in which there may be as few as 4 layers or as many as 12 layers within each stack.

Each layer within the stack, other than the covering layer, when provided, may comprise a single pultruded fibrous composite strip extending across the full width of the layer. Such an arrangement has the advantage of simplicity and hence low manufacturing cost, since only one strip is required within each layer. Furthermore, since each layer within the stack has the same width, all of the pultruded fibrous composite strips, other than the covering layer when provided, can be made from the same pultrusion apparatus, or indeed may be cut from the same pultruded strip.

Alternatively, each layer may comprise a parallel arrangement of a plurality of pultruded fibrous composite strips. This may take the form of a first configuration in which the side, or longitudinal, edges of the strips within each layer of the stack the inn are aligned with side (longitudinal) edges of the strips in the other layers, in which case each strip will be of a smaller width than with the above arrangement in which each layer comprises only one strip. However, the strips can still have the same width and therefore be formed from the same pultrusion apparatus or cut from the same pultruded strip. In a second configuration, the inner side (longitudinal) edges of the strips within each layer of the stack are staggered with respect to the inner side edges of the strips within the or each adjacent layer. Although this means that not all of the strips will have the same width and must therefore be formed from more than one pultrusion apparatus, this can result in a more stable stack. Indeed, such a configuration is typically found in a brick wall.

In each of the above arrangements in which each layer comprises more than one strip, the strips within each layer may alternatively, or in addition, be arranged end to end. This could be advantageous, for example, where the reinforcing structure is of a substantially length, in which case the manufacture could be simplified by forming the reinforcing structure from a number of relatively short pultruded strips.

It is important that the pultruded fibrous composite strips are of sufficient tensile strength, but can be formed from fibres selected from: carbon fibres; glass fibres; aramid fibres; and natural fibres, including wood fibres and organic fibres, including combinations of any of these types of fibre. In the preferred embodiment the pultruded fibrous composite strips are formed from carbon fibres embedded in a thermoset resin matrix. Carbon fibres are particularly desirable due to their high strength-to-weight ratio in comparison to other fibres such as glass fibres.

In a preferred embodiment, the reinforcing structure includes an elongate support element for supporting the stack of layers. This assists in the process of moving the entire reinforcing structure, when formed, into the desired position within the wind turbine blade. The preferred configuration of the support element is a channel having a generally U-shaped cross section, and wherein the stack of layers is supported within the channel. This is particularly convenient since the stack is substantially rectangular in cross section. It is especially preferred that at least the width of the U-shaped cross section correspond to the width of the stack, since in this case the side arms of the U-shape will prevent any undesirable lateral movement of the layers within the stack during transportation.

The support element may conveniently be made from a glass-reinforced plastics (GRP) material and may also either comprise or contain a lightning conductor.

As above, the support element is preferably formed from a glass-reinforced plastics (GRP) material and may comprise a lightning conductor.

The skins are preferably made from GRP.

With this arrangement, each half-shell can be formed separately and then the two halves joined together before the entire shell, with the reinforcing structures in position, is cured by heating.

The inner and outer skins of the half-shells may be made from a glass fibre epoxy resin composite.

The wind turbine blade preferably further comprises at least one elongate web located between the reinforcing structures within the opposing half-shells so as to transfer shear forces acting on the wind turbine blade in use. Such as web may therefore be referred to as a "shear web". The combination of two such reinforcing structures and the web emulates, and possesses the structural advantages of, an I-beam.

In one embodiment, each shell comprises two reinforcing structures, and the elongate web is X-shaped in cross section. In this case, each of the two diagonals of the X-shape preferably extends between a respective two of the reinforcing structures. Such an arrangement enables a single web to be provided for four reinforcing structures.

The X-shaped web is preferably formed from two V-shaped webs connected together, since V-shaped webs can readily be stacked or nested for ease of storage and transport.

Furthermore, the web is preferably made from a resilient material so as to conform more readily to the shape of the mould during manufacture of the turbine blades.

The X-shaped resilient web is preferably made slightly larger than the distance between the two half-shells, so that the web will flex to some extent when the half-shells are brought together. Not only does allow for greater tolerances in the size of the web, but also enables a good adhesive bond to be established between the web and the half-shells. Once the adhesive is cured, the web is locked in the desired position, and the height of the web matches the separation between the two half-shells.

In this case, the web preferably comprises a respective flange at each end of the two diagonals of the X-shaped cross section, so as to direct the shear force from the full width of each reinforcing structure into the web.

As an alternative to the provision of an X-shaped web, a conventional C-shaped web may be provided, where the two arms of the C-shape may constitute flanges for attaching the web between the outer half-shells of the blade.

An additional web having a Z-shaped cross section may also be provided. This is particularly desirable when there are six reinforcing structures, since an X-shaped web may be provided for absorption of the shear forces between four opposing reinforcing structures, typically within the leading edge of the blade, and the Z-shaped web may then be provided for absorbing the shear forces between the remaining two opposed reinforcing structures, typically within the trailing edge portion of the blade, i.e., positioned between the X-shaped web and the trailing edge of the blade. The terms "leading edge" and "trailing edge" will be described in greater detail below.

In a preferred arrangement, four of the reinforcing structures extend in generally parallel directions along the length of the blade, whereas the remaining two reinforcing structures are shorter and extend away from the other reinforcing structures at the wider sections of the blade to form "rear stringers". The resulting separation of the reinforcing structures at the wide portions of the blade gives rise to improved edgewise stiffness. The provision of the rear stringers also reduces the length of the unsupported blade shell between the main structure and the trailing edge, which, in turn, enables the structural foam in the blade to be thinner. By retaining separation between the reinforcing structures at the root end of the blade, the termination of the structures can be affected with a reduced concentration of stresses.

The upper and lower arms of the Z-shape preferably serve as flanges for connecting the web between the two outer half-shells of the blade, e.g., by applying a layer of adhesive to the exposed outer surfaces of the arms. Thus, only the central section of the Z-shaped web extends into the space between the associated reinforcing structures.

In the case of a X-shaped web, the diagonals of the X-shape are preferably bent at the intersection, such that the angle between two adjacent arms is different from the angle between the other two arms.

Alternatively, the web may be of a Y-shaped cross section.

In each case, the web or webs are preferably formed from a resilient material. This is of particular benefit when upper and lower half-shells are connected together with the webs in position between the half-shells but physically attached to only the lower half-shell, since, on joining the two half-shells together, the free ends of the webs to which a layer of adhesive may be applied will exert a force against the upper half-shell which is sufficient to cause the free ends of the webs to adhere to the upper half-shell.

In all of the above-described arrangements, the inner and outer skins preferably extend substantially uninterrupted across the core material and the reinforcing structures.

In accordance with a further aspect of the present invention, there is provided a method of manufacturing a wind turbine blade of generally hollow construction and formed from first and second opposing half-shells; constructing each half-shell from an inner skin and an outer skin; locating first and second elongate reinforcing structures on the outer skin so as to extend along the lengthwise direction of the blade; each reinforcing structure comprising a stack of layers, each stack having a thickness which extends in a direction substantially perpendicular to a surface of the blade; each layer extending across a width of the respective stack, the width being perpendicular to the lengthwise direction of the blade and perpendicular to the thickness of the stack, and each layer comprising at least one pre-cured pultruded fibrous composite strip; disposing within each half-shell core material on the outer skin so as to extend: (a) between the first and second elongate reinforcing structures; (b) from the first elongate reinforcing structure towards a leading edge of the blade; and (c) from the second elongate reinforcing structure towards a trailing edge of the blade; disposing the inner skin on the upper surface of the first and second elongate reinforcing structures and the core material; and disposing an elongate web so as to extend between at least one of the reinforcing structures in the first half-shell and one of the reinforcing structures in the second half-shell.

In a preferred embodiment, the method comprises manufacturing a wind turbine blade of the above type, in which the one or more reinforcing structures extend at least part way along the length of the wind turbine blade along a respective predetermined curve defined by the outer profile of the wind turbine blade, the method comprising, for the or each reinforcing structure: providing a substantially rigid elongate support surface within a mould, the support surface extending along the predetermined curve and which is oriented at each position along the predetermined curve at an angle which depends on the degree of curvature at that position, thereby to facilitate accurate positioning of the reinforcing structure; introducing the support element into the mould; and positioning the reinforcing structure along the support surface.

The step of positioning the reinforcing structure may be achieved by sliding the support element along the support surface towards the predetermined curve.

By suitably orienting the support surface in this way, analogous to the banking of roads at bends, the support element can be moved into the desired final position within the mould by sliding it along the support surface. In this way, the support surface thus acts as a steering or guiding surface for the reinforcing structure.

It is preferred that the stack is placed on the support element as a first step, and that the complete reinforcing structure is moved into position in this way, although it would of course be possible to move only the support element into its desired position within the mould as a first step, and then to introduce the stack into the mould, e.g., by sliding the stack along the support element. It would alternatively be possible to introduce the individual layers of the stack into the mould one at a time.

The support surface may conveniently be one surface of an elongate wedge arranged on the surface of the mould. In this case, the wedge may be made from structural foam.

In a preferred embodiment, the wind turbine blade comprises at least one elongate reinforcing structure which extends in the lengthwise direction of the wind turbine blade along a respective predetermined curve defined by the outer profile of the wind turbine blade, and each reinforcing structure comprises a reinforcing element supported within a channel of generally U-shaped cross section, and the method comprises positioning each reinforcing structure within a mould.

In this case, the channel may first be positioned within the mould, and then the reinforcing element placed into the channel. Alternatively, the reinforcing element may first be positioned within the channel, and then the entire reinforcing structure, i.e., the channel containing the reinforcing element, may then be positioned within the mould.

A substantially rigid elongate support surface may advantageously be provided within the mould, the support surface extending along the predetermined curve and which is oriented at each position along the predetermined curve at an angle which depends on the degree of curvature at that position, thereby to facilitate accurate positioning of the reinforcing structure; and the method preferably comprises: introducing the reinforcing structure into the mould; and positioning the reinforcing structure along the support surface, e.g., by sliding the support element along the support surface towards the predetermined curve.

The steps of introducing the pre-cured stack and the other structural elements can be performed in any desired sequence.

Alternatively, the or each reinforcing structure may be built up from the U-shaped channel and the individual pultruded strips in situ within the mould.

Although in the preferred embodiment, there are six reinforcing structures within the turbine blade, there may of course be either fewer or more, depending on the size and/or shape of the turbine blade and the degree of reinforcement required.

The invention also provides a method of manufacturing a wind turbine blade of generally hollow construction and comprising first and second half-shells;
disposing, in each of a first and second elongated half-mould, one or more fibre cloths for respective outer skins;

locating, in each of the first and second elongated half-moulds, first and second elongate reinforcing structures on the fibre cloths for the outer skins so as to extend along the lengthwise direction of the respective half-moulds;

each reinforcing structure comprising a stack of layers, each stack having a thickness which extends in a direction substantially perpendicular to a surface of the respective half-mould;

each layer extending across a width of the respective stack, the width being perpendicular to the lengthwise direction of the respective half-mould and perpendicular to the thickness of the stack, and each layer comprising at least one pre-cured pultruded fibrous composite strip;

disposing within each of the respective half-mould core material on the fiber cloths for the outer skin so as to extend: (a) between the first and second elongate reinforcing structures; (b) from the first elongate reinforcing structure towards a leading edge of the respective half-mould; and (c) from the second elongate reinforcing structure towards a trailing edge of the respective half-mould;

disposing, in each of a first and second elongated half-mould, on upper surfaces of the first and second elongate reinforcing structures and the core material, one or more fibre cloths for respective inner skins;

supplying resin into the first and second half-moulds; and subsequently curing the resin so as to form the first and second half-shells.

Preferably, the method comprises subsequently disposing an elongate web in one of the half-moulds; pivoting the first half-mould into a position above second half-mould, so as for the elongate web to extend between at least one of the reinforcing structures in the first half-shell and at least one of the reinforcing structures in the second half-shell. Preferably, the method comprises locating, within at least one of the half-moulds, a pre-cured mesh between the outer skin and a region of abutment of one of the elongate reinforcing structures and the core material. Preferably, the method comprises locating, within at least one of the half-moulds, a pre-cured mesh located between the inner skin and a region of abutment of one of the elongate reinforcing structures and the core material.

Further aspects of the present invention are as follows:

(a) An elongate reinforcing structure for a wind turbine blade, the structure being arranged to extend, in use, along the lengthwise direction of the blade, the structure comprising a stack of layers, the stack having a width which extends, in use, in a direction generally parallel to a surface of the wind turbine blade, each layer extending across the width of the stack and comprising at least one pultruded fibrous composite strip.

Such a reinforcing structure is of simpler construction than known structures and is therefore cheaper to manufacture.

It will be appreciated that the support element for the reinforcing structure which is described above in relation to a preferred embodiment provides advantages which are not necessarily limited to the particular type of reinforcing structure. Consequently, the present invention extends to:

(b) A wind turbine blade comprising at least one elongate channel of generally U-shaped cross section in which an elongate reinforcing structure may be supported.

It will be appreciated that the provision of a web having an X-shaped cross section provides advantages to wind turbine blades having reinforcing structures which are not necessarily of the types described above. For this reason, the present invention extends to:

(c) A wind turbine blade of generally hollow construction, the blade being formed from two opposing half-shells, each half-shell comprising at least two elongate reinforcing structures each extending along the lengthwise direction of the blade, and further comprising a web located between the reinforcing structures within the opposing half-shells so as to transfer shear forces acting on the wind turbine blade in use, the web having an X-shaped cross section.

(d) A wind turbine blade of generally hollow construction, the blade being formed from first and second opposing half-shells, the first half-shell comprising at least two elongate reinforcing structures and the second half-shell comprising at least one elongate reinforcing structure, each extending along the lengthwise direction of the blade, and further comprising a web located between the reinforcing structures within the opposing half-shells, the web having a Y-shaped cross section.

(e) A method of manufacturing a wind turbine blade of the above type, in which the one or more reinforcing structures extend at least part way along the length of the wind turbine blade along a respective predetermined curve defined by the outer profile of the wind turbine blade, the method comprising, for the or each reinforcing structure: providing a substantially rigid elongate support surface within a mould, the support surface extending along the predetermined curve and which is oriented at each position along the predetermined curve at an angle which depends on the degree of curvature at that position, thereby to facilitate accurate positioning of the reinforcing structure; introducing the support element into the mould; and positioning the reinforcing structure along the support surface.

(f) A method of manufacturing a wind turbine blade comprising at least one elongate reinforcing structure which extends in the lengthwise direction of the wind turbine blade along a respective predetermined curve defined by the outer profile of the wind turbine blade, and wherein the or each reinforcing structure comprises a reinforcing element supported within a channel of generally U-shaped cross section, the method comprising, for the or each reinforcing structure, positioning the reinforcing structure within a mould.

(g) A method of manufacturing a wind turbine blade comprising at least one elongate reinforcing structure which extends in the lengthwise direction of the wind turbine blade along a respective predetermined curve defined by the outer profile of the wind turbine blade, the method comprising, for the or each reinforcing structure: providing a substantially rigid elongate support surface within the mould, the support surface extending along the predetermined curve and which is oriented at each position along the predetermined curve at an angle relative to the surface of the mould which depends on the degree of curvature at that position, thereby to facilitate accurate positioning of the reinforcing structure; introducing the reinforcing structure into the mould; and positioning the reinforcing structure along the support surface, e.g., by sliding the support element along the support surface towards the predetermined curve.

The or each reinforcing structure may be formed and pre-cured in a separate mould and then introduced, together with the other components of the wind turbine blade, into the main mould. With such an arrangement, it is possible to introduce the pre-cured reinforcing structure into the main mould without the use of the U-shaped channels or wedge-shaped supports described above.

Furthermore, such a procedure is advantageous with reinforcing structures other than those described above. For example, reinforcing structures made from fibre cloths, as opposed to pultruded strips, could be pre-cured in this way and then introduced into the main mould for forming a wind turbine blade. In this case, each fibre cloth could be introduced separately into the mould, or a complete stack of fibre cloths formed as a first step, which is then placed into the mould.

Thus, in accordance with a further aspect of the present invention, there is provided:

(h) A method of manufacturing a wind turbine blade comprising at least one reinforcing structure, the method comprising: forming a stack of fibrous layers; pre-curing the stack of fibrous layers in a first mould; introducing the pre-cured stack into a second mould; introducing other structural elements of the wind turbine into the second mould; and integrating the stack and the other structural elements together in the second mould.

BRIEF DESCRIPTION OF THE DRAWINGS

In order that the present invention may more readily be understood, preferred embodiments thereof will now be described with reference to the accompanying drawings, in which:

FIGS. 3(a) and 3(b) are cross-sectional sketches of arrangements of reinforcing structures within a half-shell of a wind turbine blade;

FIGS. 7(a) and 7(b) are two schematic representations of an X-section web, in accordance with a preferred embodiment, at different positions along the length of a wind turbine blade;

FIGS. 10(a) to 10(f) illustrate alternative forms of web, in accordance with further embodiments, shown at different positions along the length of a wind turbine blade;

DETAILED DESCRIPTION OF THE DRAWINGS

Figure 1:
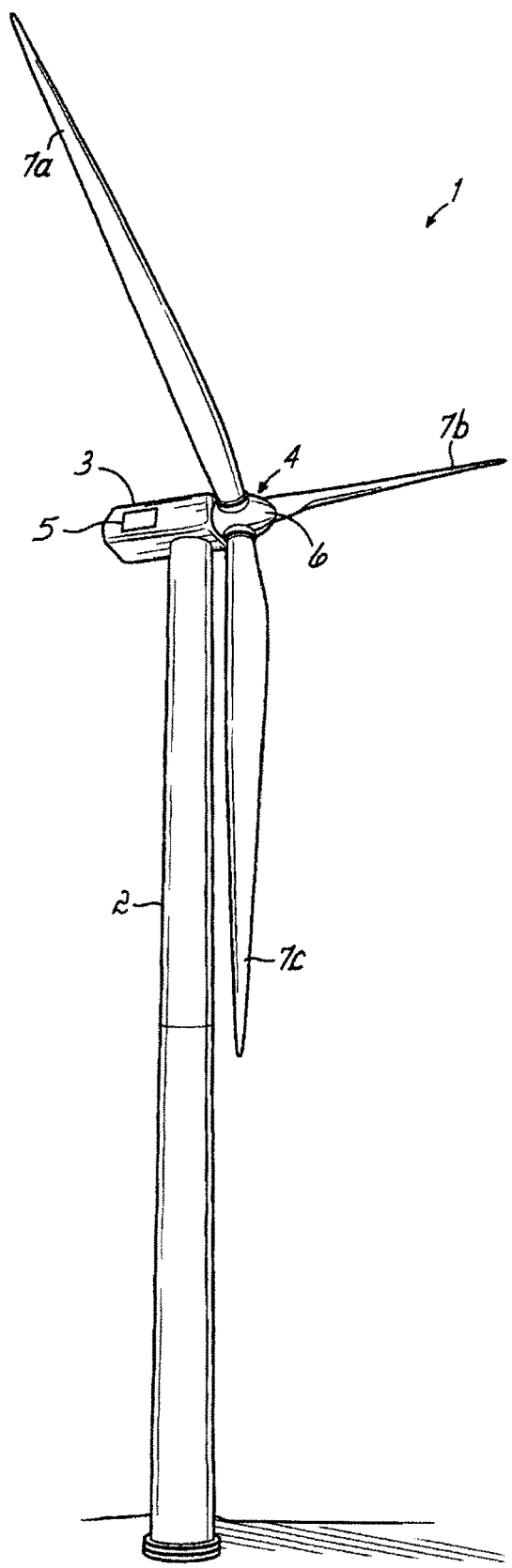
FIG. 1 illustrates the main structural components of a wind turbine.

Throughout the following description of the preferred embodiments of the present invention, and in the drawings, the same reference numerals are used to indicate the same, or corresponding, structural features.

Figure 2:
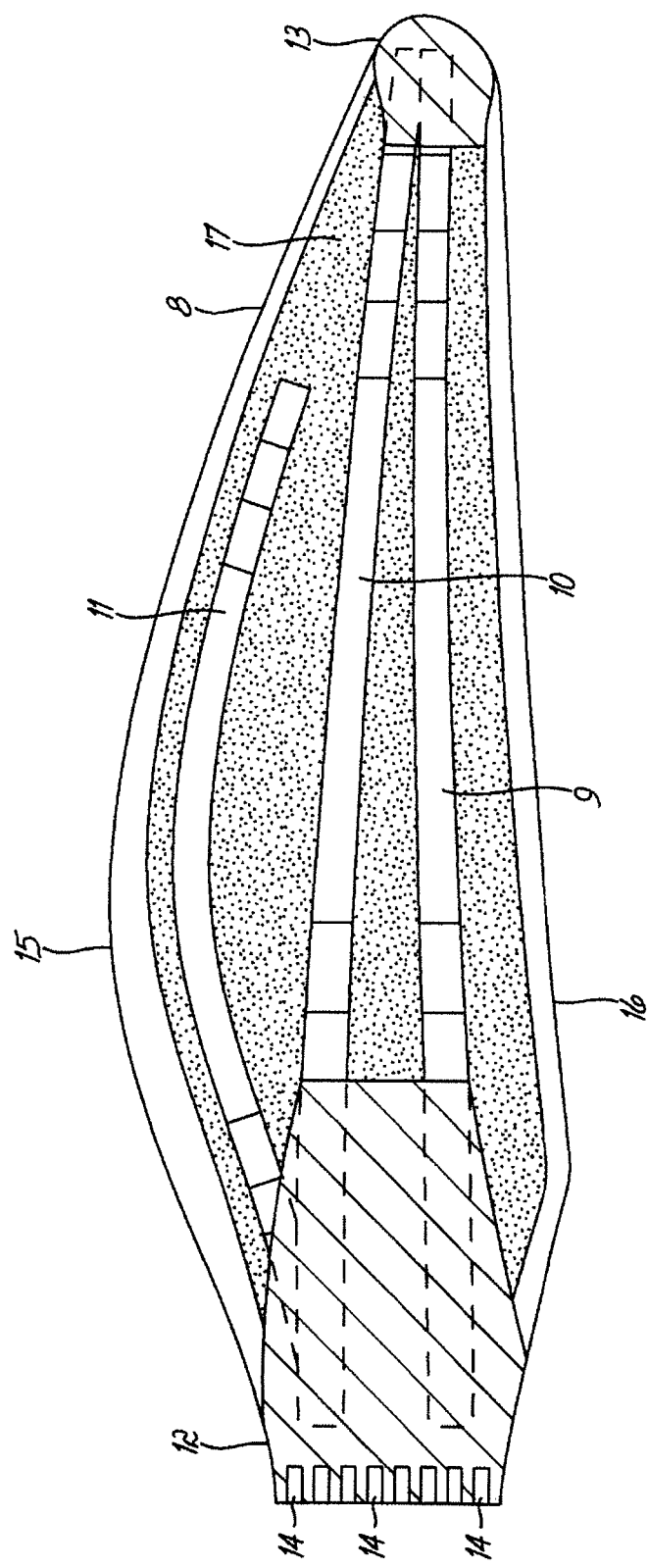
FIG. 2 is a schematic illustration of the inner surface of one half of the outer shell of a wind turbine blade incorporating reinforcing structures in accordance with a preferred embodiment of the present invention.

Referring to FIG. 2, one half 8 of the outer shell of a wind turbine blade is formed with three elongate reinforcing structures 9, 10, 11, to be described in greater detail below. Two of the reinforcing structures 9, 10 extend substantially along the full length of the turbine blade from the root section 12 to the blade tip 13. The root section 12 of the blade is formed with threaded metallic inserts 14 for receiving bolts by which the blade is attached to the central hub of the wind turbine, as described above with reference to FIG. 1.

The third reinforcing structure 11 extends only part-way along the blade from the root section 12 and is also laterally displaced from the other two reinforcing structures 9, 10 towards the trailing edge 15 of the blade and away from the leading edge 16 of the blade.

The two reinforcing structures 9, 10 form the spar caps of the wind turbine blade and the third reinforcing structure 11 acts as a stiffener for the trailing edge 15.

The ends of the three reinforcing structures 9, 10, 11 within the root section 12 of the blade are encased in a glass-reinforced plastics (GRP) material for added strength and stability, as are the distal ends of the two reinforcing structures 9, 10 which extend to the blade tip 13.

The remaining portions of the outer shell are filled with structural foam 17, and the reinforcing structures 9, 10, 11 and the structural foam 17 are all formed within an outer skin and an inner skin to be described in greater detail below.

The structural foam 17 is a lightweight core material, and it will be appreciated that other core materials can be used, such as wood, particularly balsa wood, and honeycomb.

The complete turbine blade is formed from the upper half 8 of the outer shell shown in FIG. 2, together with a corresponding lower half and two internal webs.

FIG. 3(a) illustrates a cross-sectional view of a conventional arrangement in which each half-shell 8' comprises an inner skin 18' and an outer skin 19' between which only a single reinforcing structure 9' is provided. The regions between the inner skin 18' and the outer skin 19' to each side of the reinforcing structure 9' are filled with structural foam 17'. As can be seen from the drawing, there is a significant curvature across the width of the half-shell 8'. Since the reinforcing structure 9' is formed with a substantially rectangular cross-section, it follows that that substantial voids 20' are formed between the outer skin 19' and the central region of the reinforcing structure 9', and between the inner skin 18' and the end regions of the reinforcing structure 9'. During the moulding stage, to be described in detail below, resin is introduced into these voids 20', which is undesirable in a composite structure, since this increases both the weight and the cost of the blade, and could also give rise to structural problems.

FIG. 3(b) is a cross-sectional view of a preferred embodiment of the present invention in which each half-shell 8 is provided with at least two reinforcing structures 9, 10 provided between the inner skin 18 and the outer skin 19. As can be seen, the volume of the resulting voids 20 which are formed between the outer skin 19 and the central region of the reinforcing structure 9, and between the inner skin 18 and the end regions of the reinforcing structure 9 is substantially less than that of the voids 20' which occur when only a single reinforcing structure 9' is provided. As a result, the amount of resin required to fill the voids 20 during the moulding process is substantially less.

In addition, by using two reinforcing structures in each half shell, as shown FIG. 3(b), as opposed to the single reinforcing structure shown in FIG. 3(a), the overall widths of the reinforcing structures are located more closely to the outer skin 19 of the wind turbine blade. This is advantageous for structural reasons, since it provides a higher second moment of inertia such that the wind turbine blade has a greater resistance to bending.

Figure 4A:
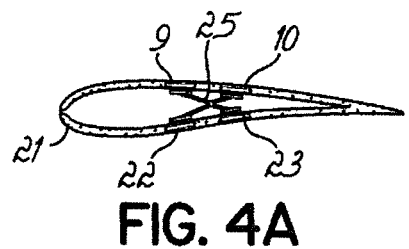
FIGS. 4(a) to 4(e) are schematic longitudinal cross-sectional views of a wind turbine blade incorporating the reinforcing structures shown in FIG. 2.

FIGS. 4(a) to 4(e) are cross-sectional representations of the complete turbine blade at different positions along the length of the blade. FIG. 4(a) represents the blade near the blade tip 13, from which it can be seen that only the first two reinforcing structures 9, 10 are present at this position along length of the upper half of the outer shell shown in FIG. 2. The lower half 21 of the outer shell is also provided with three reinforcing structures 22, 23, 24, again only two of which 22, 23 are present at this position.

A resilient elongate web 25 made from a layer of balsa wood or lightweight foam sandwiched between two outer layers of GRP and having a generally X-shaped longitudinal cross section is provided within the outer shall and serves to transfer the shear forces which act on the turbine blade in use. One of the two diagonal arms of the X-shape extends between a first pair of the reinforcing structures 9, 23, and the other diagonal arm extends between a second pair of the reinforcing structures 10, 22.

Figure 4B:
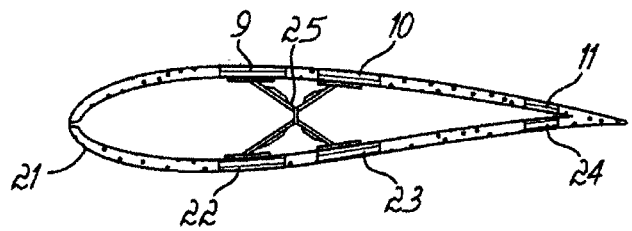

In FIG. 4(b), which represents a position along the length of the turbine blade between that of FIG. 4(a) and the central section, the end-portions of the two remaining reinforcing structures 11, 24 can be seen.

Figure 4C:
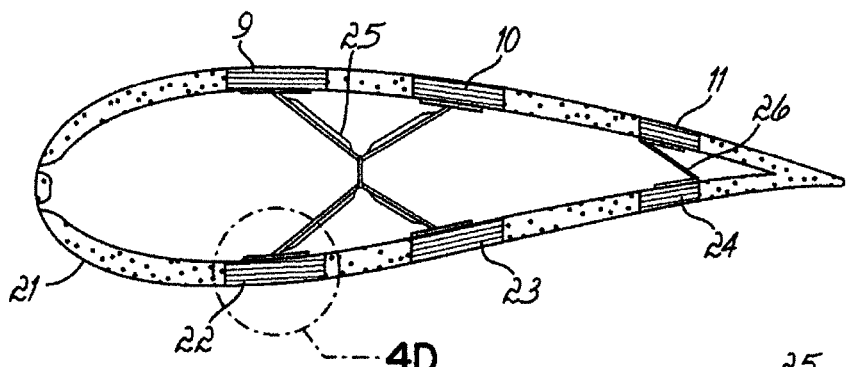

FIG. 4(c) represents the central section of the turbine blade, from which it can be seen that a further resilient elongate web 26 having a generally Z-shaped longitudinal cross section is provided which extends between the two reinforcing structures 11, 24 at the trailing edge 15 of the blade. The two outer limbs of the Z-shape act as flanges for connecting the Z-shaped web 26 to the two associated reinforcing structures 11, 24.

Figure 4D:
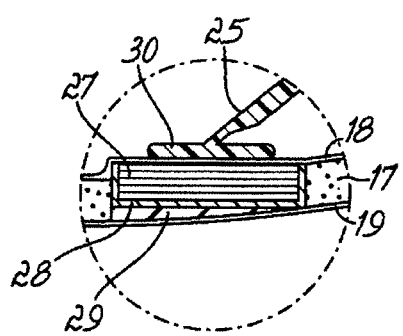

Referring to FIG. 4(d), which is a detail of the cross-sectional view of FIG. 4(c), the reinforcing structure 22 is sandwiched between the inner skin 18 and the outer skin 19, and the remaining parts of the outer shell are formed from a layer of structural foam 17, also sandwiched between the inner and outer skins 18, 19. The skins are made from GRP.

The reinforcing structure 22 is in the form of a stack 27 of layers of pultruded fibrous composite strips supported within a U-shaped channel 28, which in turn is supported on an elongate wedge 29 such that the base of the channel 28 is at an acute angle to the outer skin 19 of the shell. The channel 28 includes material which acts as a lightning conductor in use. In other embodiments, the U-shaped channel 28 and the wedge 29 may be omitted.

The end of the arm of the X-shaped web 25 is provided with a flange 30 for directing the shear force applied across the full width of the reinforcing structure 22 to the X-shaped web 25.

It will be appreciated that the enlarged view shown in FIG. 4(d) applies equally to each of the six reinforcing structures 9, 10, 11, 22, 23, 24.

Figure 4E:
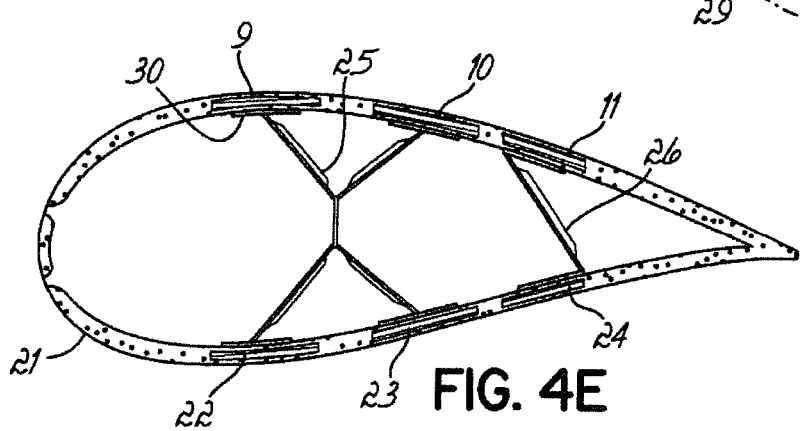

FIG. 4(e) illustrates a cross-sectional view of the blade between the central section represented in FIG. 4(c) and the root section 12, and it can be seen that the reinforcing structures 9, 10, 11, 22, 23, 24 within each half-shell are closer together than at the central section of the blade, reflecting the curvature of the reinforcing structures.

In FIGS. 4(a) to 4(e) it can be seen that the reinforcing structures 9, 10, 22 and 23 are spar caps which, together with the shear webs 25, form the main structural spar of the wind turbine blade. The reinforcing structures 11 and 24 at the trailing edge stiffen the wind turbine blade in the region of the trailing edge to provide stability against buckling and, together with the web 26, form a trailing edge spar.

Each of the stacks 27 of the reinforcing structures 9, 10, 11, 22, 23, 24 is tapered longitudinally at both ends. This is achieved by a reduction in the number of layers of pultruded fibrous strips from five at the central section to only a single layer at each end. This feature is indicated in the drawings, wherein, in FIGS. 4(a) and 4(e), the respective stacks 27 of the reinforcing structures 9, 10, 22, 23, 24 have only a single layer, whereas the stacks 27 within the central section illustrated in FIG. 4(c) have five layers. Equally, in FIG. 4(b), the stacks 27 of the reinforcing structures 9, 10, 22, 23 at the ends of the X-shaped web 25 have five layers, whereas the stacks 27 of the reinforcing structures 11, 24 at the ends of the Z-shaped web 26 have only a single layer.

This feature enables the reinforcing structures 9, 10, 11, 22, 23, 24 to adopt a profile consistent with the thickness profile of the outer shell of the blade.

Figure 5:
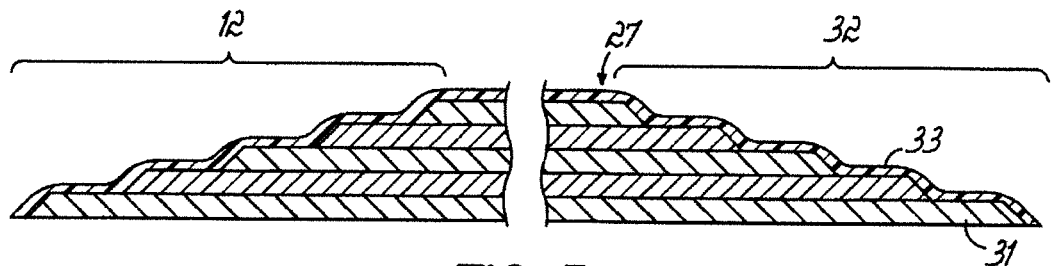
FIG. 5 illustrates a lateral cross-sectional view of part of one of the reinforcing structures illustrated in FIG. 2.

This is further illustrated in the side cross-sectional view of FIG. 5, which shows how the thickness of the stack 27 of five layers 31 is tapered towards both the root end 12 and the distal end 32. It should be emphasised that the drawing is merely illustrative of the tapered arrangement: in practice, the tapering may be distributed throughout a large part of the length of the reinforcing structure.

Two further features of the preferred embodiment enhance the smoothness of the tapering so as reduce the impact of stresses which would arise with discontinuities in the surface profile of the stack 27. First, each layer 31 is chamfered at both ends so as to remove the square-cut ends which are formed during the cutting of the pultruded strips which form the layers 31. Secondly, the stack 27 is covered with a top layer 33 formed from an additional pultruded fibrous composite strip having a lesser thickness than that of the underlying layers 31. Since the top layer 33 is thinner than the other layers 31, it is also more flexible and therefore able to bend around the angled chamfered ends of the stack 27 within the tapered end regions to form a relatively smooth upper surface.

Each layer 31 within the stack has a thickness of approximately 4 mm, and the thickness of the top layer is approximately 1 mm.

Figure 6A:
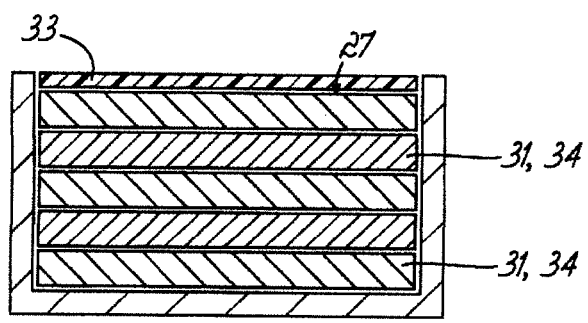
FIGS. 6(a) to 6(c) illustrate longitudinal sections of three different embodiments of reinforcing structures in accordance with the present invention.
Figure 6B:
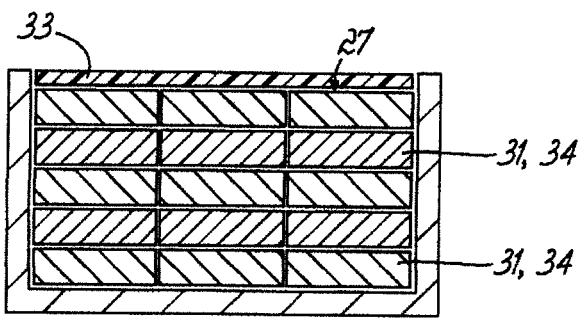
Figure 6C:
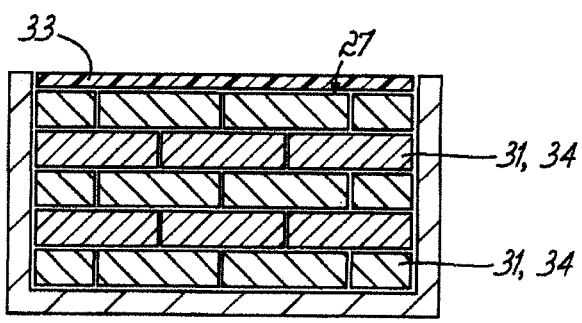

FIGS. 6(a) to 6(c) are longitudinal cross-sectional views showing three different arrangements of pultruded fibrous composite strips, or pultrusion strips 34 within the five layers 31. In FIG. 6(a), each layer 31 has only a single pultrusion strip 34 within each layer. In FIG. 6(b), each layer 31 is formed from a parallel arrangement of three pultrusion strips 34 of equal width laid together side by side. In FIG. 6(c), each layer 31 has either three or four pultrusion strips 34 in a parallel side-by-side arrangement, but containing pultrusion strips 34 of two different widths.

In the preferred embodiments, each of the pultrusion strips 34 within the above three arrangements extends the full length of the respective layer 31, although it may be beneficial in some embodiments for at least some of the layers 31 to include shorter strips 34 which are arranged end to end.

FIGS. 7(a) and 7(b) illustrate in greater detail the central section and root section 12 respectively of the wind turbine blade showing the X-shaped resilient web 25. The reinforcing structures are not shown in the drawings, for the sake of clarity. The web is formed in two generally V-shaped halves 25a, 25b, and the lower ends of each half 25a, 25b as viewed in the drawings is attached to the lower half of the outer shell by means of a layer of adhesive (not shown), and the two halves 25a, 25b of the web 25 are joined together by bolts 36.

Figure 8:
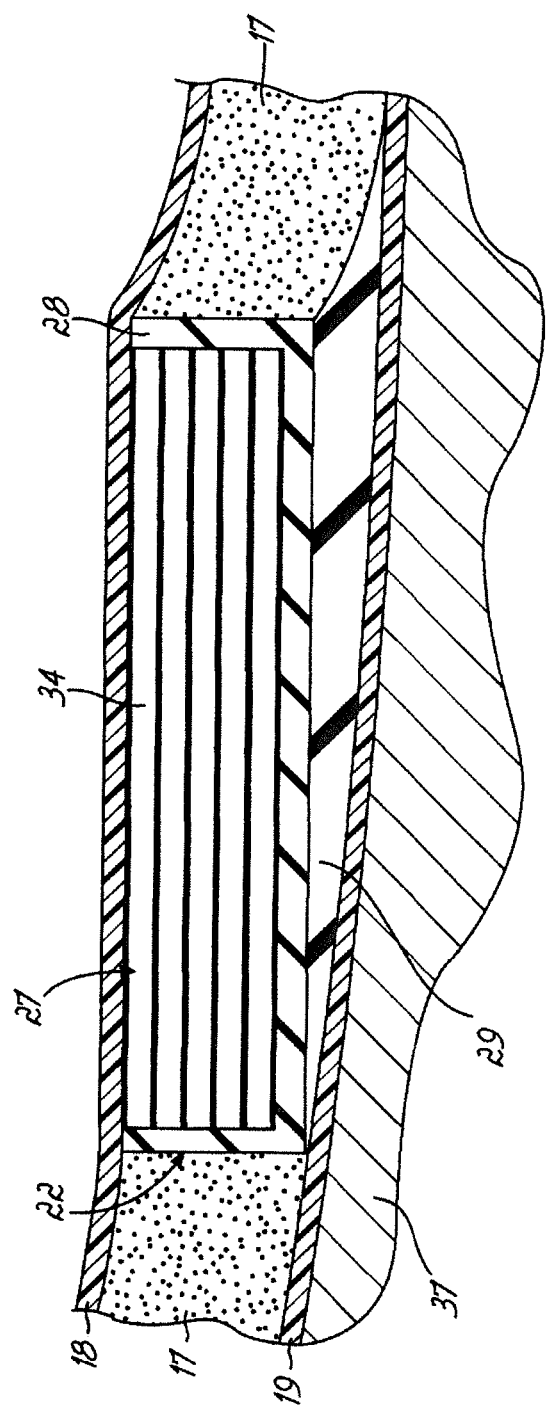
FIG. 8 is a longitudinal cross-sectional view of a reinforcing structure mounted within a mould during the manufacture of a wind turbine blade in accordance with a preferred embodiment.

FIG. 8 is a longitudinal cross-sectional view illustrating in greater detail the region of the outer shell which includes a reinforcing structure 22 within a lower half-mould 37. During manufacture, the outer skin 19, in the form of a dry fibre cloth, or a plurality of superposed and/or overlapping dry fibre cloths, is first placed on the surface of the half-mould 37, and elongate wedges 29 are then positioned on the outer skin 19 along the curvilinear regions where the reinforcing structures 9, 10, 11, 22, 23, 24 are to be positioned. The inner skin, described further below, is also formed by a dry fibre cloth, or a plurality of superposed and/or overlapping dry fibre cloths. The dry cloths are, once positioned in the half-moulds with other components as described below, impregnated with resin supplied into the half-moulds, e.g., in an infusion process, such as the one described below. It should be pointed out that as an alternative, also mentioned below, the inner and outer skin could be provided from prepreg (pre-impregnated fibre) cloths, where the resin is supplied into the half-moulds together with the fibre material of the cloths.

The reinforcing structures are positioned along respective upper surfaces of the wedges 29. This can be achieved by firstly positioning the U-shaped channel 28 of each reinforcing structure along the upper surface of the wedge 29 and then introducing the stack 27 of pultruded layers of fibrous composite strips into the channel 28, or alternatively forming the entire reinforcing structure outside the half-mould 37 and then placing it along the upper surface of the wedge 29. In either case, the reinforcing structure can be lowered into position on the wedge 29 or slid into position along the surface of the wedge 29.

The orientation of the upper surfaces of the wedges 29 is varied along their length in dependence on the curvature of the linear regions so as to retain the reinforcing structures in the desired positions.

A layer of structural foam 17 is then introduced into the half-mould 37 to fill the regions between the reinforcing structures 9, 10, 11, 22, 23, 24. The inner skin 18, in the form of a dry fibre cloth, or a plurality of superposed and/or overlapping dry fibre cloths, is then placed on the upper surfaces of the reinforcing structures and the structural foam 17 and the components covered with an airtight bag to form an evacuation chamber which is subsequently evacuated and resin introduced, as described in greater detail below.

The components within the lower half-mould 37 are then heated and the resin thereby cured so as to form the lower outer half-shell of the blade.

The inner skin 18 and the outer skin 19 are formed in this embodiment from a layer of biax glass cloth, although multiple layers may alternatively be used. As mentioned above, it would also be possible to omit the U-shaped channel 28 and the elongate wedges 29 so that the stack 27 is formed and located directly on the outer skin 19. It would also be possible to position the structural foam 17 on the outer skin 19 and then subsequently to introduce the stack 28 into the mould 37.

An upper half-mould with an outer shell is then positioned above the lower half-mould 37 mould so as to form the complete outer shell of the blade.

Figure 9A:
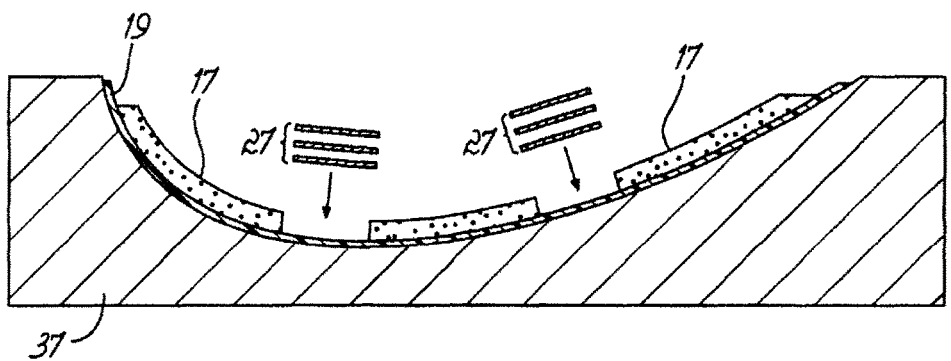
FIGS. 9(a) and 9(b) illustrate a method of manufacturing a wind turbine blade in accordance with a preferred embodiment of the present invention.
Figure 9B:
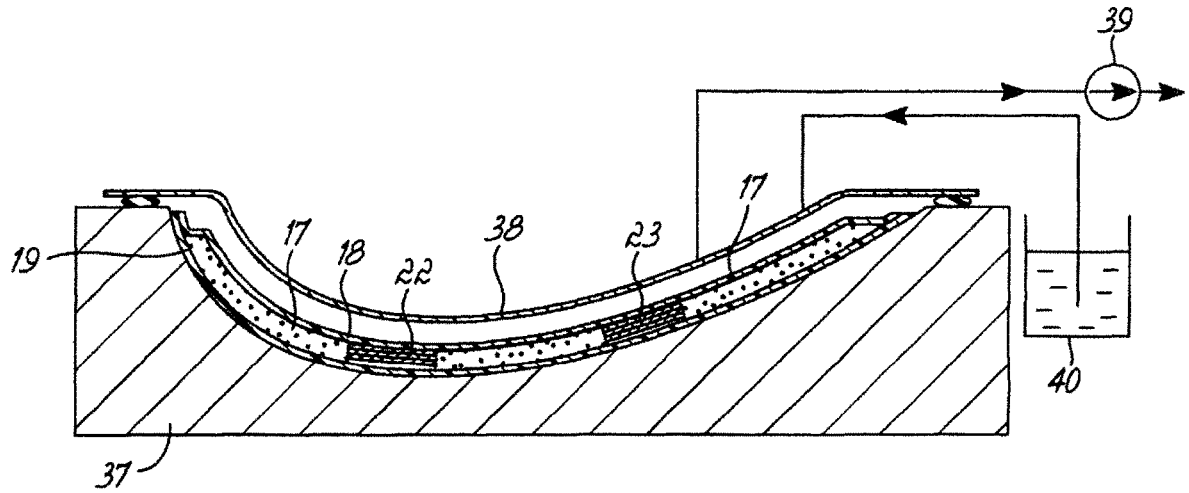

FIG. 9(a) illustrates the overall structure of the components of the lower half of the outer shell when in the lower mould-half 37. Referring to FIG. 9(b), after the inner skin 18 has been placed over the surface of the reinforcing structures 22, 23 and the upper surface of the structural foam 17, an air-tight sealing layer (i.e., a vacuum bag) 38 is attached to the mould so as form an evacuation chamber encapsulating all of the components, and the chamber is then evacuated using a vacuum pump 39. With the pump 39 still energised, a supply of liquid resin 40 is connected to the chamber so as to infuse both the components and the interstitial spaces therebetween. A corresponding infusion process is applied to the components of the upper half of the outer shell. The pump 39 continues to operate during a subsequent moulding operation in which the mould is heated so as to cure the resin, although during the curing process the extent of de-pressurisation may be lowered.

The X-shaped web 25 and the Z-shaped web 26 are then attached by means of adhesive to the inner skin 18 immediately above the reinforcing structures 22, 23, 24 in the lower half-mould 37, and the upper free ends of the webs 25, 26 are coated with respective layers of adhesive.

The upper half-mould is then pivoted into position above the lower half-mould 37, and the two half-moulds connected together. This causes the reinforcing structures 9, 10, 11 within the upper half-mould to adhere to the upper free ends of the webs 25, 26. The resilient nature of the webs 25, 26 give rise to a biasing force of the webs 25, 26 against the upper reinforcing structures 9, 10, 11 so as to ensure good adhesion. The leading edge of the blade is formed along leading edges of the respective half-moulds, and trailing edge of the blade is formed along trailing edges of the respective half-moulds.

The mould is then opened, and the finished turbine blade lifted from the mould.

FIGS. 10(a) to 10(f) are cross-sectional illustrations of alternative embodiments of wind turbine blades in which each of the webs 41, 42, 43 is of I-shaped cross section, which, in combination with the associated reinforcing structures, results in an I-beam construction. Since each of the webs is provided with a flange 30 at each end, these could alternatively be considered as C-section webs, where the arms of the C-shape constitute the flanges 30.

In FIGS. 10(a) to 10(c), there are only four reinforcing structures 9, 10, 22, 23. FIG. 10(a) represents a cross sectional view near the blade tip, FIG. 10(b) a sectional view mid-way along the blade, and FIG. 10(c) a sectional view near the root end, where it can be seen that the thickness of the reinforcing structure 9, 10, 22, 23 is tapered. As can be seen from the drawings, the reinforcing structures within each half-shell are closer together near the tip of the blade.

In FIGS. 10(d) to 10(f), there are six reinforcing structures 9, 10, 11, 22, 23, 24, and a respective I-shaped web 41, 42, 43 linking each pair of opposed structures 9, 19; 10, 23; and 11, 24. FIG. 10(d) represents a cross sectional view near the blade tip, FIG. 10(e) a sectional view mid-way along the blade, and FIG. 10(f) a sectional view near the root end, where again it can be seen that the thickness of the reinforcing structure 9, 10, 22, 23 is tapered.

Figure 11A:
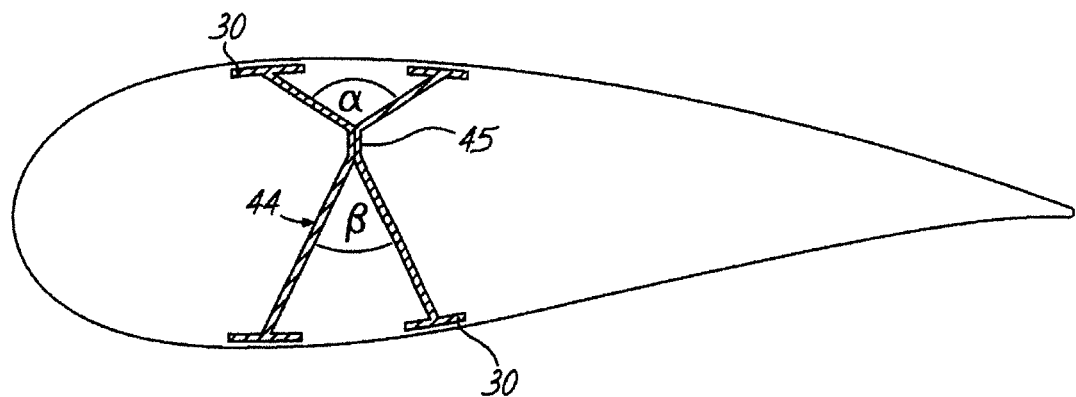
FIGS. 11(a) and 11(b) illustrate further alternative forms of web, in accordance with embodiments of the present invention.
Figure 11B:
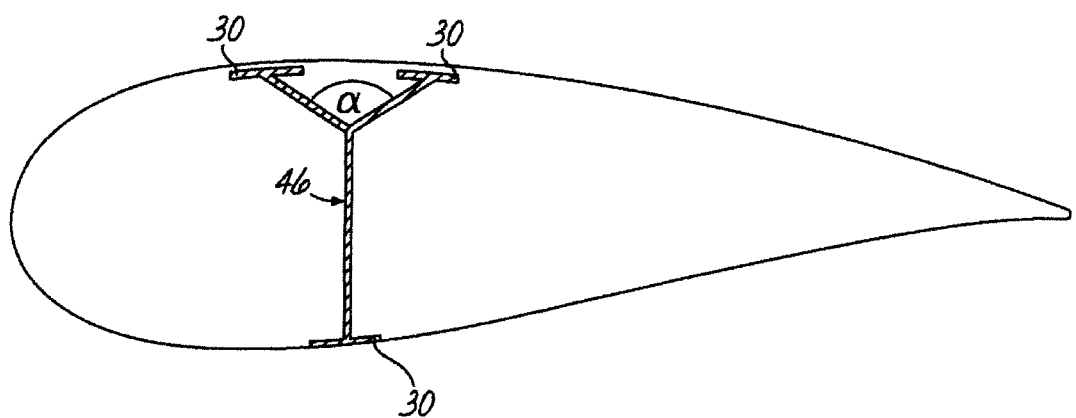

FIGS. 11(a) and 11(b) illustrate two further forms of web. In FIG. 11(a), the web 44 has an X-shaped cross section in which the two diagonals are bent at the intersection 45, so that the upper limbs diverge at an angle α which is greater than the angle β between the lower two limbs. An advantage of this arrangement is that the upper wide angle gives rise to additional flexibility when the two half-moulds are closed, while the lower limbs serve merely to bridge the gap between the two shells. In FIG. 11(*b*), the lower two limbs have been combined into a single limb, resulting in a web 46 of Y-shaped cross section. Such a web can replace the X-shaped and/or Z-shaped webs described above.

Figure 12:
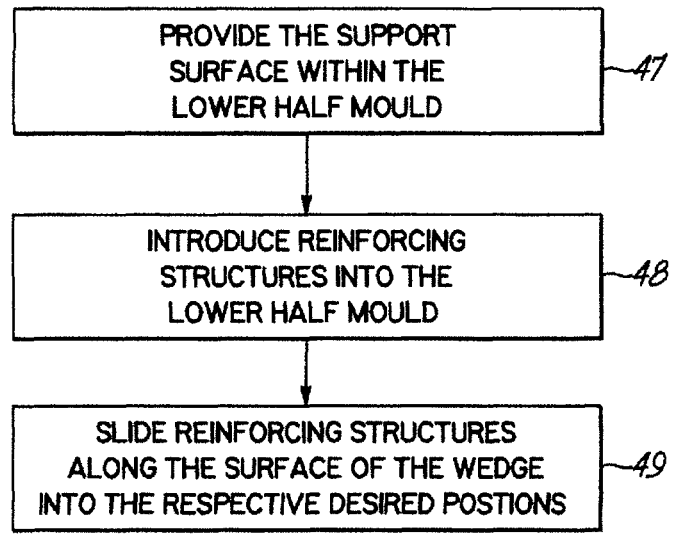
FIG. 12 is a flowchart illustrating steps in the manufacture of a wind turbine blade in accordance with a preferred embodiment of the present invention.

Referring to FIG. 12, the method described above can be summarised as comprising a step 47 of providing the support surface within the lower half-mould 37, a step 48 of introducing reinforcing structures 9 into the lower half-mould 37 and a step 49 of sliding the reinforcing structures 9 along the surface of the wedge 29 into the respective desired positions.

Figure 13:
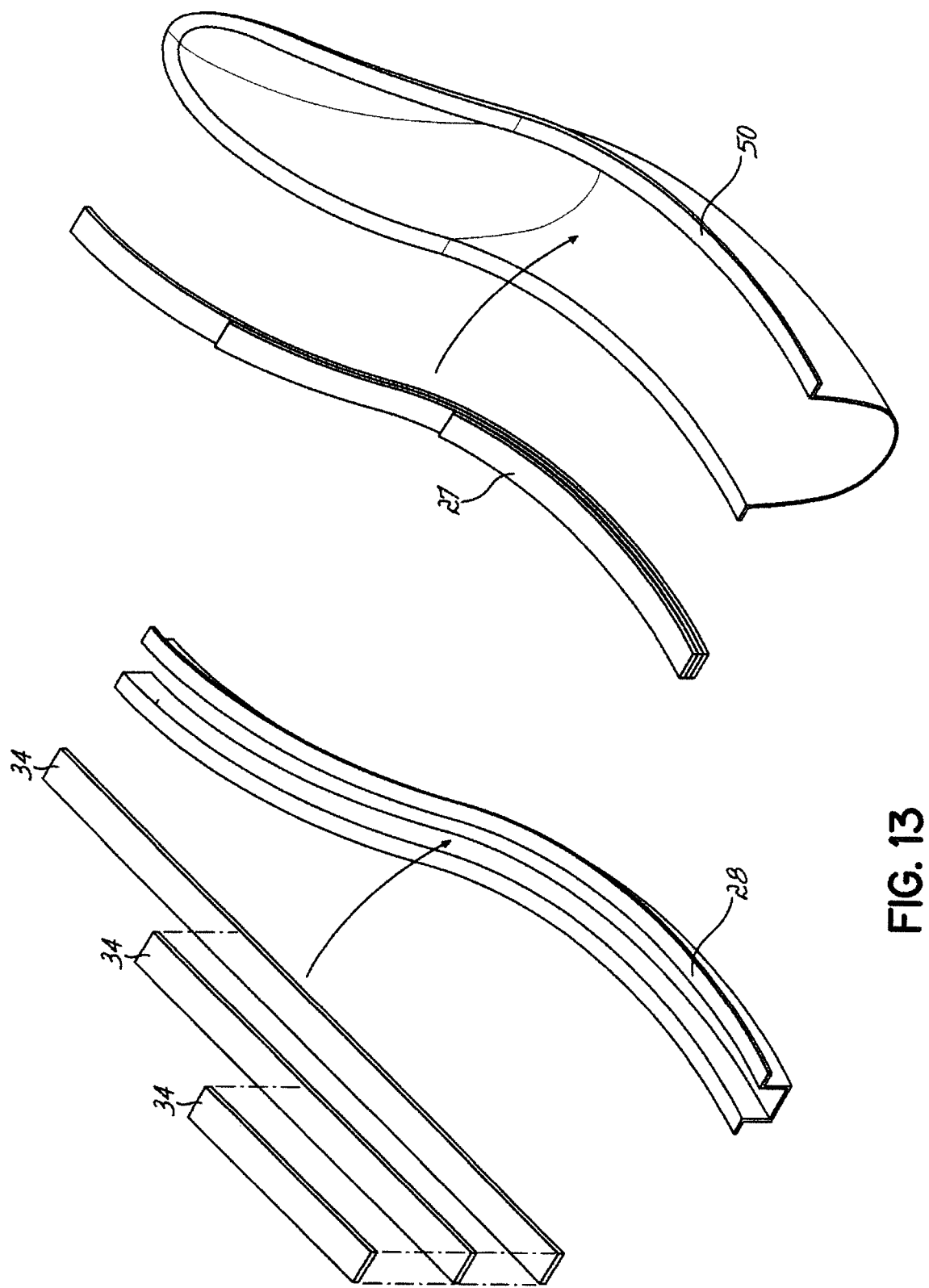
FIG. 13 illustrates an alternative method in the manufacture of a wind turbine in accordance with an embodiment of the present invention.

FIG. 13 illustrates an alternative method, in which the pultruded strips 34 are placed in a separate mould, provided as a U-shaped channel 28, outside of the main half-mould 50, together with a matrix (resin or adhesive) which is pre-cured so that the stack 27 is formed in the separate mould 28. The pre-cured cured stack 27 is then placed in the main half-mould 50 for an infusion resin process together with the other structural elements.

Figure 14:
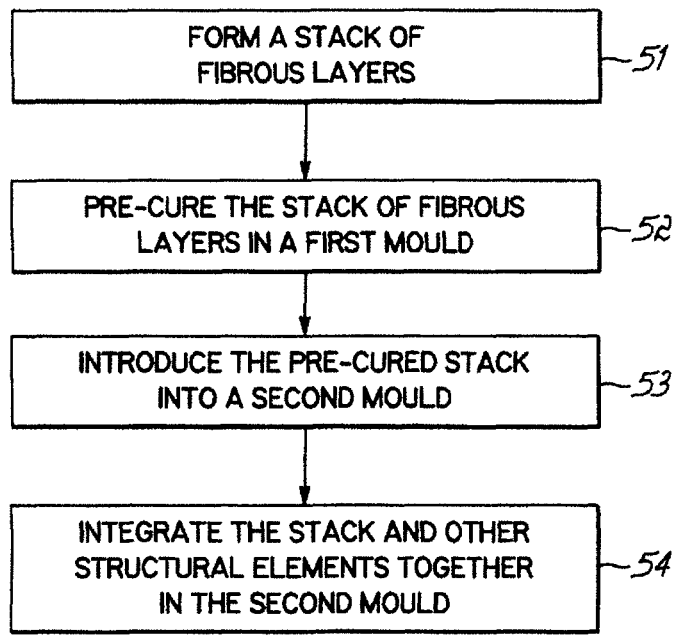
FIG. 14 is a flowchart illustrating the steps in the method shown in FIG. 12.

Referring to FIG. 14, this method can be summarised as comprising the following steps: (a) forming a stack of fibrous layers 51; (b) pre-curing the stack of fibrous layers in a first mould 52; (c) introducing the pre-cured stack into a second mould 53; and (d) integrating the stack and the other structural elements together in the second mould 54. In some embodiments, the stack can be partially cured in the first mould and then fully cured in the second mould. In other embodiments the stack can be fully cured in the first mould and integrated as such with the other structural elements in the second mould wherein some of other structural elements are cured.

Figure 15A:
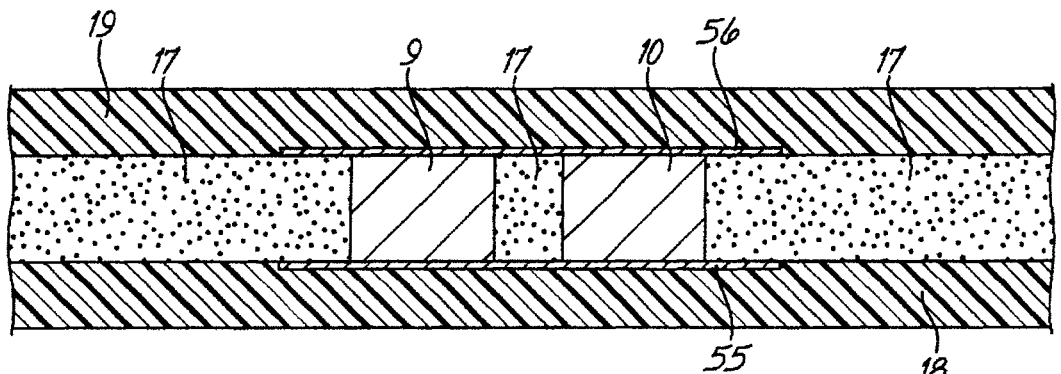
FIGS. 15(a) to 15(c) illustrate a preferred embodiment in which meshes are provided in each half-shell of the wind turbine blade.
Figure 15B:
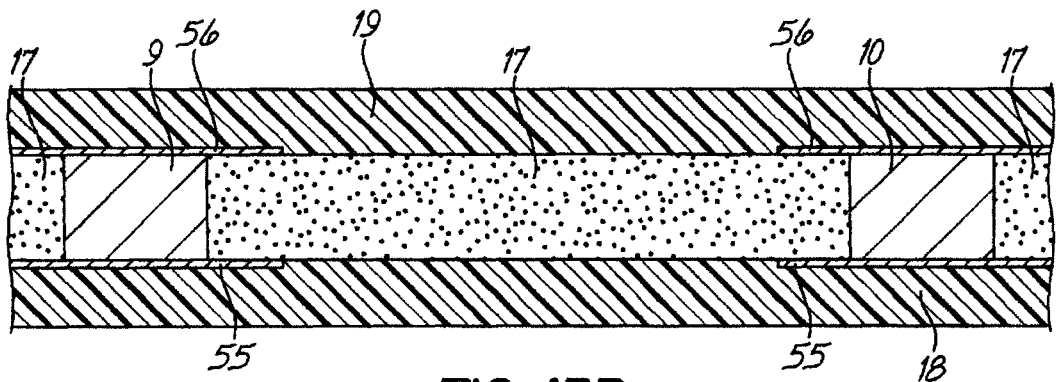
Figure 15C:
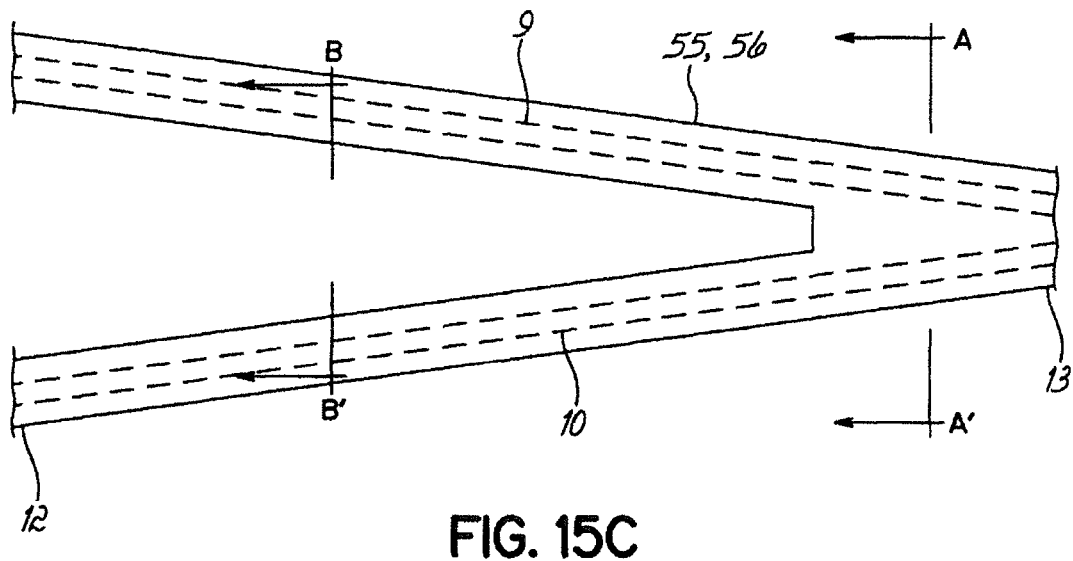

FIGS. 15(*a*) to 15(*c*) illustrate schematically a further preferred embodiment, which may be combined with any of the embodiments described above. For the sake of enhanced clarity, the elements are not drawn to scale. In each half-shell 8 there are provided inner and outer pre-cured meshes 55, 56 formed from glass weave and pre-cured resin, and these are positioned between the respective inner and outer skins 18, 19 and the underlying reinforcing structures 9, 10. The meshes 55, 56 extend over the regions where the underlying reinforcing structures 9, 10 abut the core material 17. In the region of the blade tip 13, the two reinforcing structures 9, 10 are closely separated, as illustrated in the cross-sectional view of FIG. 15(*a*) taken along the line A-A' of FIG. 15(*c*). In this case, each of the inner and outer meshes 55, 56 extends across both of the underlying reinforcing structures 9, 10, so as to cover all of the four transition regions between the reinforcing structure 9, 10 and the core material 17. However, in the region of the root section 12 of the blade, the two reinforcing structures 9, 10 are further apart, as illustrated in the cross-sectional view of FIG. 15(*b*) taken along the line B-B' of FIG. 15(*c*). In this case, each of the inner and outer meshes 55, 56 extends across only a respective one of the underlying reinforcing structures 9, 10, so as to cover only the two transition regions between the respective reinforcing structure, e.g., 9 and the adjacent core material 17.

The function of the inner and outer meshes 55, 56 is to prevent the inner and outer skins 17, 18 from wrinkling due to: (a) gaps between the underlying reinforcing structures 9, 10 and the adjacent core material 17; and (b) any slight differences between the thickness of the underlying reinforcing structures 9, 10 and the thickness of the core material 17.

FIG. 15(*c*) is a plan view of this arrangement, from which it can be seen that the meshes 55, 56 form an approximate V-shape. The outlines of the reinforcing structures 9, 10 sandwiched between the inner and outer meshes 55, 56 are illustrated in the drawing by the dashed line. The side edges of the inner and outer meshes 55, 56 extend about 20 mm over the underlying core material. It would also be possible to provide a single pre-cured mesh 55 located under the reinforcing structures 9, 10 and the core material 17. However, in practice, it is beneficial for the layup, i.e., the inner and outer layers 17, 18, the reinforcing structures 9, 10 and the foam 17, to be symmetrical about a mid-point plane of the layup.

It will be appreciated that numerous variations to the above embodiments may be made without departing from the scope of the present invention which is defined solely by the following claims. For example, although in the preferred embodiment there are six reinforcing structures and both an X-shaped web and a Z-shaped web, alternative embodiments may comprise only four reinforcing structures and a single X-shaped web.

In a further example, as opposed to using the resin infusion method of manufacturing the blade described above with reference to FIG. 9(*b*), fibres which are pre-impregnated with resin (i.e., "pre-preg" fibres) may be used for the inner and outer skins, in which case it would not be necessary to infuse resin into the shell construction. In this arrangement, adhesive film layers can be provided between the individual layers in the stack so that they adhere together when the structure is cured.

The invention claimed is:

1. A wind turbine blade of generally hollow construction and formed from first and second opposing half-shells;
    each opposing half-shell comprising an inner skin and an outer skin and first and second elongate reinforcing structures being located between the inner and outer skins;
    each elongate reinforcing structure extending along a lengthwise direction of the wind turbine blade and comprising a stack of layers;
    each stack of layers having a thickness which extends in a direction substantially perpendicular to a surface of the wind turbine blade and a width that is perpendicular to the lengthwise direction of the wind turbine blade and perpendicular to the thickness of the stack, and each layer comprising at least one pre-cured pultruded fibrous composite strip;
    each opposing half-shell further comprising core material disposed between the inner and outer skins and extending: (a) between the first and second elongate reinforcing structures; (b) from the first elongate reinforcing structure towards a leading edge of the wind turbine blade; and (c) from the second elongate reinforcing structure towards a trailing edge of the wind turbine blade;
    a first elongate web extending between the first elongate reinforcing structure in the first and second opposing half-shells; and
    a second elongate web extending between the second elongate reinforcing structure in the first and second opposing half-shells.

2. The wind turbine blade as claimed in claim 1, wherein the first and second elongate reinforcing structures and the core material define abutment edges which are substantially perpendicular to the surface of the wind turbine blade.

3. The wind turbine blade as claimed in claim 1, further comprising, within each opposing half-shell, a pre-cured mesh located between the outer skin and at least one of the first or second elongate reinforcing structures.

4. The wind turbine blade as claimed in claim 3, wherein the or each pre-cured mesh is formed from glass weave and pre-cured resin.

5. The wind turbine blade as claimed in claim 1, further comprising, within each opposing half-shell, a pre-cured mesh located between the inner skin and at least one of the first or second elongate reinforcing structures.

6. The wind turbine blade as claimed in claim 1, further comprising, within at least one of the first or second opposing half-shells, a pre-cured mesh located between the outer skin and a region of abutment of one of the first or second elongate reinforcing structures and the core material.

7. The wind turbine blade as claimed in claim 1, further comprising, within at least one of the first or second opposing half-shells, a pre-cured mesh located between the inner skin and a region of abutment of one of the first or second elongate reinforcing structures and the core material.

8. The wind turbine blade as claimed in claim 1, wherein each layer comprises a single pultruded fibrous composite strip extending across a full width of the layer.

9. The wind turbine blade as claimed in claim 1, wherein each layer comprises a plurality of pultruded fibrous composite strips.

10. The wind turbine blade as claimed in claim 9, wherein the plurality of pultruded fibrous composite strips comprises a parallel configuration of strips within each layer.

11. The wind turbine blade as claimed in claim 10, wherein longitudinal edges of the plurality of pultruded fibrous composite strips within each layer of the stack are aligned with edges of the plurality of pultruded fibrous composite strips of other layers that form the stack of layers.

12. The wind turbine blade as claimed in claim 10, wherein longitudinal inner edges of the plurality of pultruded fibrous composite strips within each layer of the stack are staggered with respect to inner longitudinal edges of another one of the plurality of pultruded fibrous composite strips within the or each adjacent layer.

13. The wind turbine blade as claimed in claim 9, wherein the plurality of pultruded fibrous composite strips comprises a plurality of strips arranged end to end.

14. The wind turbine blade as claimed in claim 1, wherein the stack further comprises a covering layer extending a full length of the stack.

15. The wind turbine blade as claimed in claim 14, wherein a thickness of the covering layer is substantially less than a thickness of the layers within the stack.

16. The wind turbine blade as claimed in claim 1, wherein the at least one pre-cured pultruded fibrous composite strip is formed from at least one of the following: carbon fibres; glass fibres; aramid fibres; and natural fibres.

17. The wind turbine blade as claimed in claim 1, further comprising an elongate support element for supporting the stack of layers.

18. The wind turbine blade as claimed in claim 17, wherein the elongate support element comprises a channel of generally U-shaped cross section, and wherein the stack of layers is supported within the channel.

19. The wind turbine blade as claimed in claim 17, wherein the elongate support element is formed from a glass-reinforced plastics (GRP) material.

20. The wind turbine blade as claimed in claim 1, wherein the first and second elongate webs are formed from a resilient material.

21. The wind turbine blade as claimed in claim 1 and comprising at least one elongate channel of generally U-shaped cross section in which an elongate reinforcing structure may be supported.

22. The wind turbine blade as claimed in claim 1, wherein the inner and outer skins extend substantially uninterrupted across the core material and the first and second elongate reinforcing structures.

23. The wind turbine blade as claimed in claim 1, wherein each of the first and second elongate webs includes a flange at each end to engage with the inner skin of the wind turbine blade.

24. The wind turbine blade as claimed in claim 23, wherein each flange has a width that is less than a width of the first and second elongate reinforcing structures of each opposing half-shell.

25. The wind turbine blade as claimed in claim 1, wherein each of the first and second elongate webs has an "I"-shaped or "C"-shaped cross-section.

26. The wind turbine blade as claimed in claim 1, wherein the first elongate reinforcing structure of the first and second opposing half-shells is located at a region of maximum distance between the first and second opposing half-shells.

27. The wind turbine blade as claimed in claim 1, wherein the second elongate reinforcing structure for each opposing half-shell is located closer to the trailing edge compared to the first elongate reinforcing structure for each opposing half-shell.

28. A method of manufacturing a wind turbine blade of generally hollow construction and comprising first and second half-shells;
  disposing, in each of a first and second elongated half-mould, one or more fibre cloths for respective outer skins;
  locating, in each of the first and second elongated half-moulds, first and second elongate reinforcing structures on the one or more fibre cloths for the outer skins so as to extend along the lengthwise direction of the first and second elongated half-moulds;
  each elongate reinforcing structure comprising a stack of layers, each stack having a thickness which extends in a direction substantially perpendicular to a surface of a corresponding one of the first and second elongated half-mould;
  each layer extending across a width of a corresponding stack, the width being perpendicular to the lengthwise direction of the corresponding one of the first and second elongated half-mould and perpendicular to the thickness of the stack, and each layer comprising at least one pre-cured pultruded fibrous composite strip;
  disposing within each of the first and second elongated half-mould core material on the one or more fiber cloths for the outer skin so as to extend: (a) between the first and second elongate reinforcing structures; (b) from the first elongate reinforcing structure towards a leading edge of the first and second elongated half-mould; and (c) from the second elongate reinforcing structure towards a trailing edge of the first and second elongated half-mould;
  disposing, in each of the first and second elongated half-mould, on upper surfaces of the first and second elongate reinforcing structures and the core material, one or more fibre cloths for respective inner skins;

supplying resin into the first and second elongated half-moulds;

subsequently curing the resin so as to form the first and second half-shells;

subsequently disposing a first elongate web and a second elongate web in one of the first and second elongated half-moulds such that the first elongate web extends between the first elongate reinforcing structure in the first and second opposing half-shells and the second elongate web extends between the second elongate reinforcing structure in the first and second opposing half-shells; and pivoting the first half-mould into a position above the second half-mould such that the first elongate web extends between the first elongate reinforcing structure in the first half-mould and the first elongate reinforcing structure in the second half-mould, and the second elongate web extends between the second elongate reinforcing structure in the first half-mould and the second elongate reinforcing structure in the second half-mould.

29. The method as claimed in claim 28, further comprising locating, within at least one of the first and second elongated half-moulds, a pre-cured mesh between the outer skin and a region of abutment of one of the first or second elongate reinforcing structures and the core material.

30. The method as claimed in claim 28, further comprising locating, within at least one of the first and second elongated half-moulds, a pre-cured mesh between the inner skin and a region of abutment of one of the first or second elongate reinforcing structures and the core material.

31. A wind turbine blade of generally hollow construction and formed from first and second opposing half-shells;

each opposing half-shell comprising an inner skin and an outer skin and first and second elongate reinforcing structures being located between the inner and outer skins;

each elongate reinforcing structure extending along a lengthwise direction of the wind turbine blade and comprising a stack of layers, each elongate reinforcing structure having a thickness which extends in a direction substantially perpendicular to a surface of the wind turbine blade and a width that is perpendicular to the lengthwise direction of the wind turbine blade and perpendicular to the thickness of the elongate reinforcing structure, and each layer comprising at least one pre-cured pultruded fibrous composite strip;

each opposing half-shell further comprising core material disposed between the inner and outer skins and extending: (a) between the first and second elongate reinforcing structures; (b) from the first elongate reinforcing structure towards a leading edge of the wind turbine blade; and (c) from the second elongate reinforcing structure towards a trailing edge of the wind turbine blade; and the wind turbine blade further comprising an elongate web extending between at least one of the reinforcing structures in the first opposing half-shell and at least one of the reinforcing structures in the second opposing half-shell;

wherein each elongate reinforcing structure has an upper surface and a lower surface which are planar in a chordwise direction of the wind turbine blade.

32. The wind turbine blade as claimed in claim 31, wherein each elongate reinforcing structure has an oblong rectangle-shaped cross-section.

33. The wind turbine blade as claimed in claim 31, wherein the layers of each stack have different lengths in the lengthwise direction such that the thickness of each elongate reinforcing structure is tapered towards at least one longitudinal end.

34. The wind turbine blade as claimed in claim 33, wherein the thickness of each elongate reinforcing structure is thickest at a central region thereof.

35. The wind turbine blade as claimed in claim 31, wherein longitudinal ends of each elongate reinforcing structure are chamfered.

36. The wind turbine blade as claimed in claim 35, wherein each elongate reinforcing structure has a constant width along a length of the reinforcing structure between the longitudinal ends.

* * * * *